United States Patent [19]

Tanaka et al.

[11] Patent Number: 5,035,597
[45] Date of Patent: Jul. 30, 1991

[54] APPARATUS FOR MANUFACTURING MULTI-ELEMENT SINTERED MATERIAL

[75] Inventors: Shoji Tanaka, Tokyo; Hisao Yamauchi, Urayasu; Yukio Yamada, Funabashi; Masayoshi Ohnuki, Ichihara; Etsuji Morita, Funabashi; Mitsunobu Toyoshima, Sakura; Yasuo Wada, Tokyo; Hirotaka Hinoshita, Mobara; Wataru Ikeda, Chiba; Etsuji Aihara, Saitama; Tutomu Kobayashi, Tokyo; Kuniaki Suguro, Kawaguchi, all of Japan

[73] Assignees: Toyo Engineering Corporation; International Superconductivity Technology Center; Taiyo Corporation, all of Tokyo, Japan

[21] Appl. No.: 611,438

[22] Filed: Nov. 2, 1990

Related U.S. Application Data

[62] Division of Ser. No. 467,750, Jan. 19, 1990, abandoned.

[30] Foreign Application Priority Data

| Jan. 24, 1989 [JP] | Japan | 1-14545 |
| Jan. 24, 1989 [JP] | Japan | 1-14546 |
| Jan. 24, 1989 [JP] | Japan | 1-14547 |

[51] Int. Cl.$^5$ ............................................. B29C 45/76
[52] U.S. Cl. ..................................... 425/135; 425/148
[58] Field of Search ............... 425/135, 148; 264/40.4, 264/56; 505/1, 725

[56] References Cited

U.S. PATENT DOCUMENTS

| 2,375,252 | 5/1945 | Sayre | 425/148 |
| 3,056,162 | 10/1962 | Fisher | 425/148 |
| 3,103,698 | 9/1963 | Wollett | 425/148 |
| 3,266,096 | 8/1966 | Thomas et al. | 425/148 |
| 3,337,907 | 8/1967 | Williams | 425/148 |

OTHER PUBLICATIONS

Poeppel et al, "Fabrication . . . Ceramics", *Chemistry of High Temperature Superconductors*, (1987), pp. 261–265.
Wong-Ng, et al, "X Ray . . . Ba$_2$YCu$_3$O$_{7-x}$", *Advanced Ceramic Materials* (1987), vol. 2, #3B @pp. 565 & 624.

*Primary Examiner*—Willard E. Hoag
*Attorney, Agent, or Firm*—Flynn, Thiel, Boutell & Tanis

[57] ABSTRACT

An apparatus for manufacturing a multielement sintered material is provided, more particularly an appartus of the automated type which weighs and mixes predetermined amounts of powdery elements, molds the mixed elements and then sinters them.

11 Claims, 29 Drawing Sheets

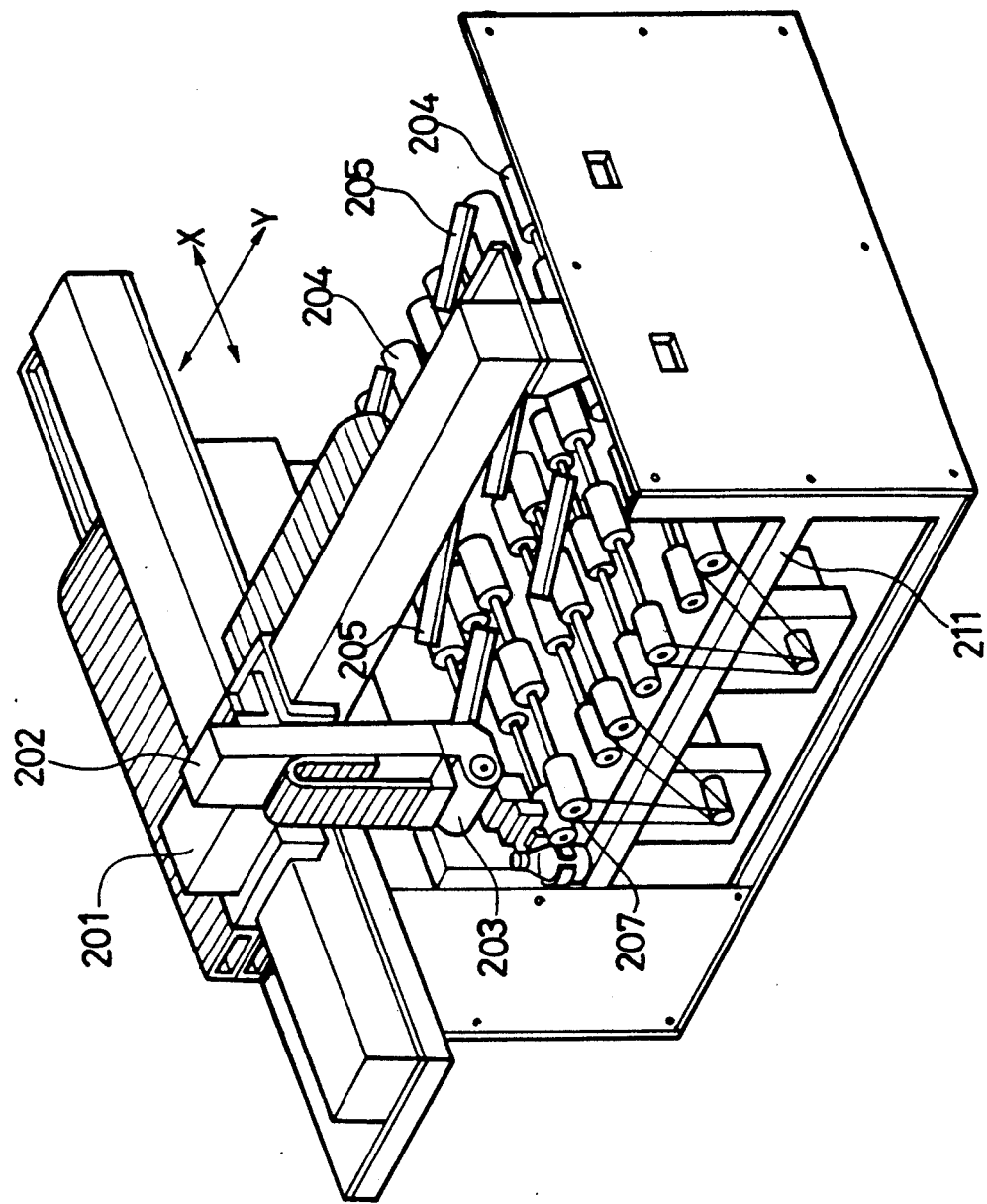

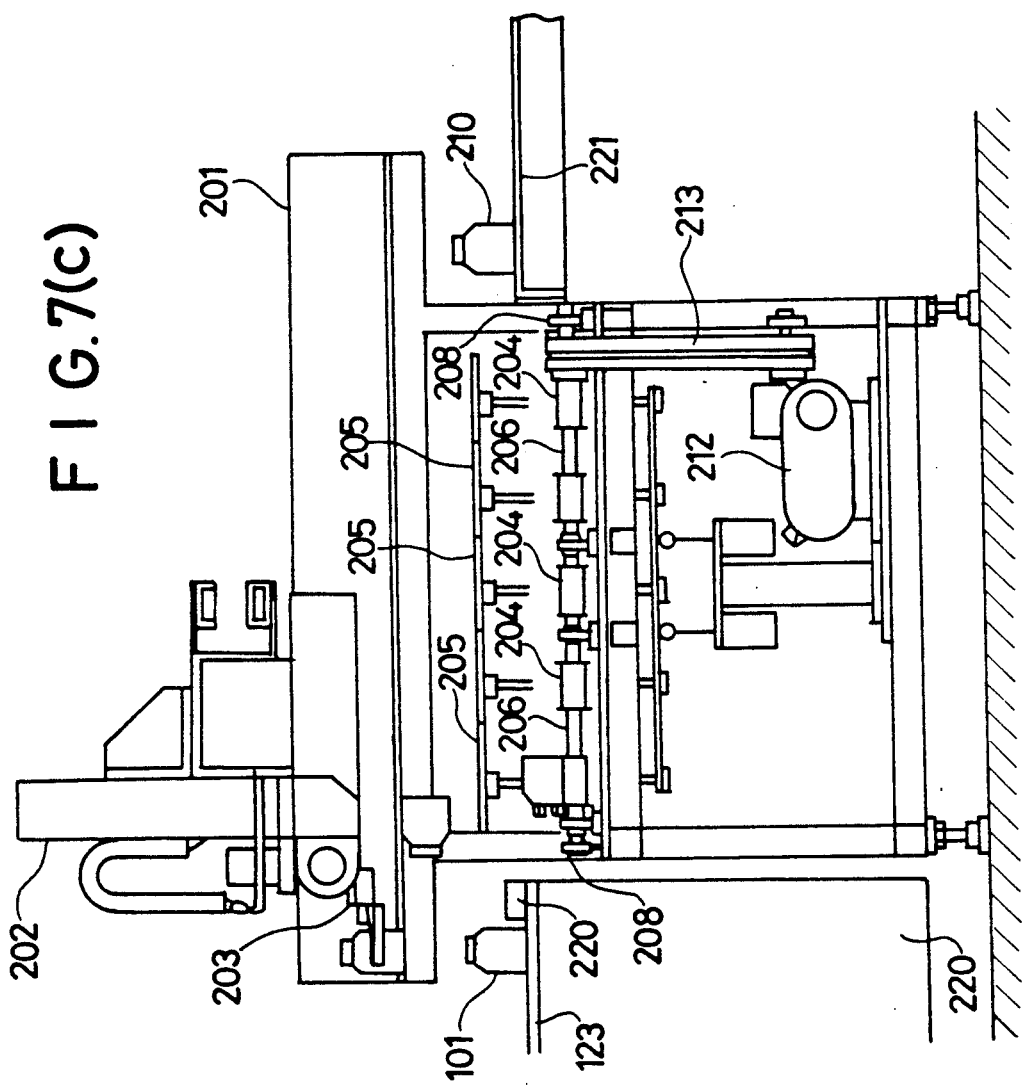

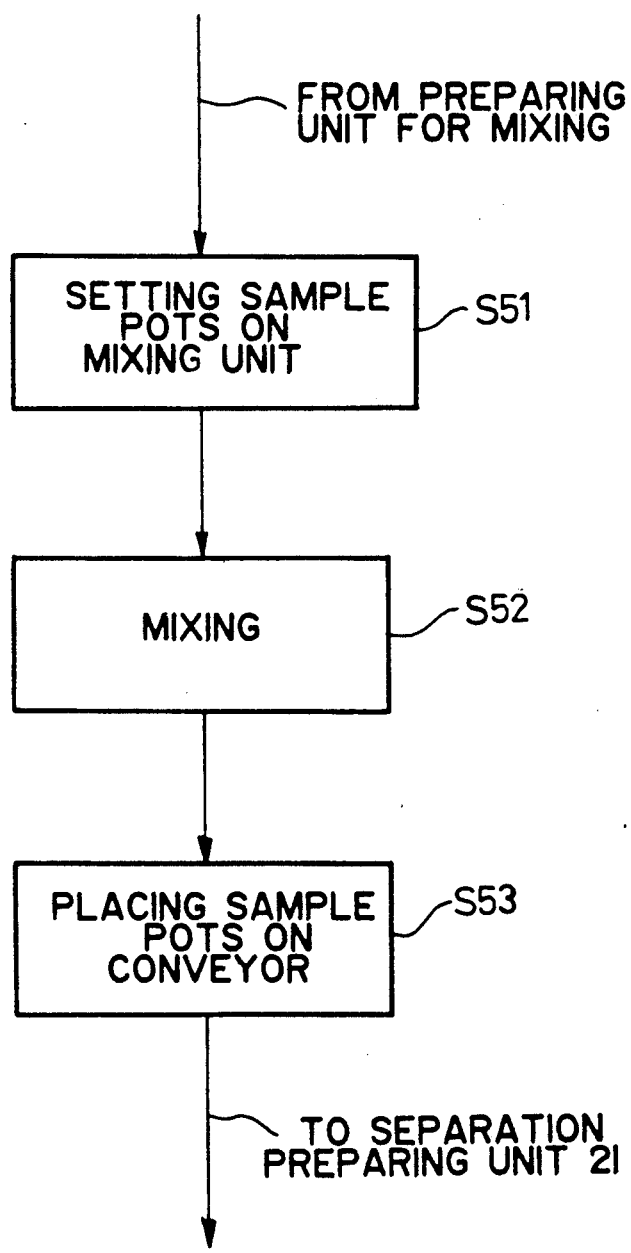

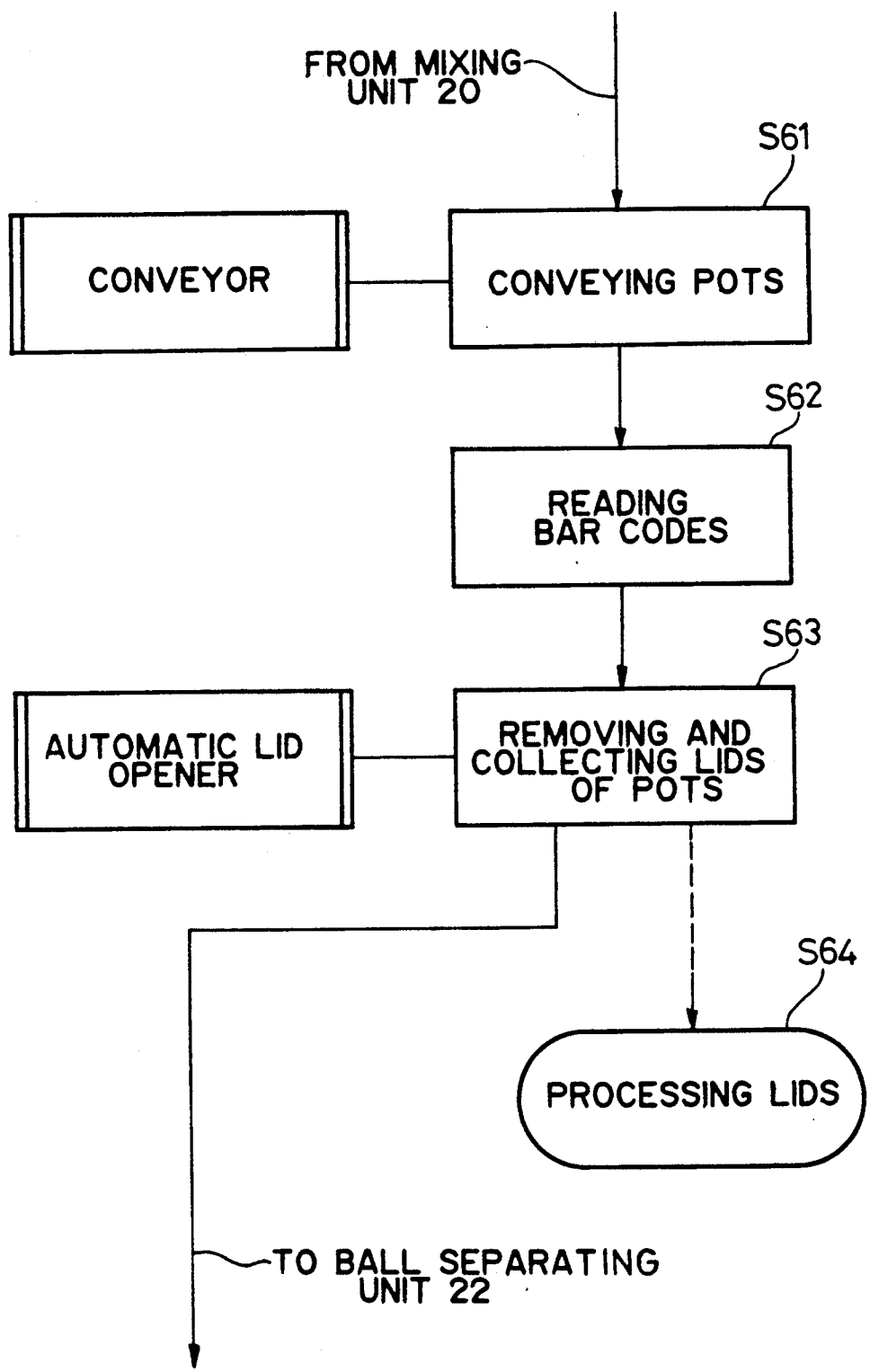

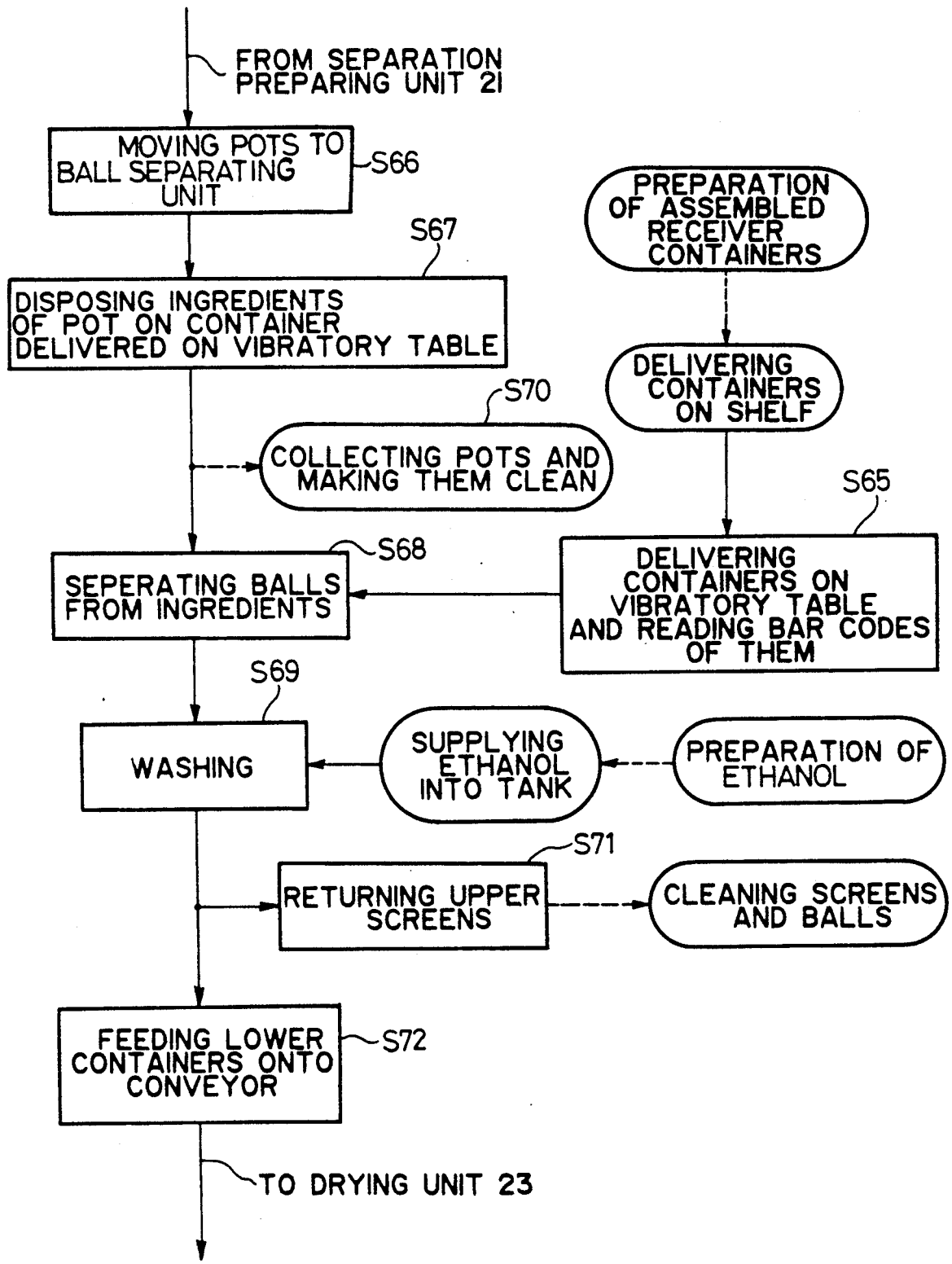

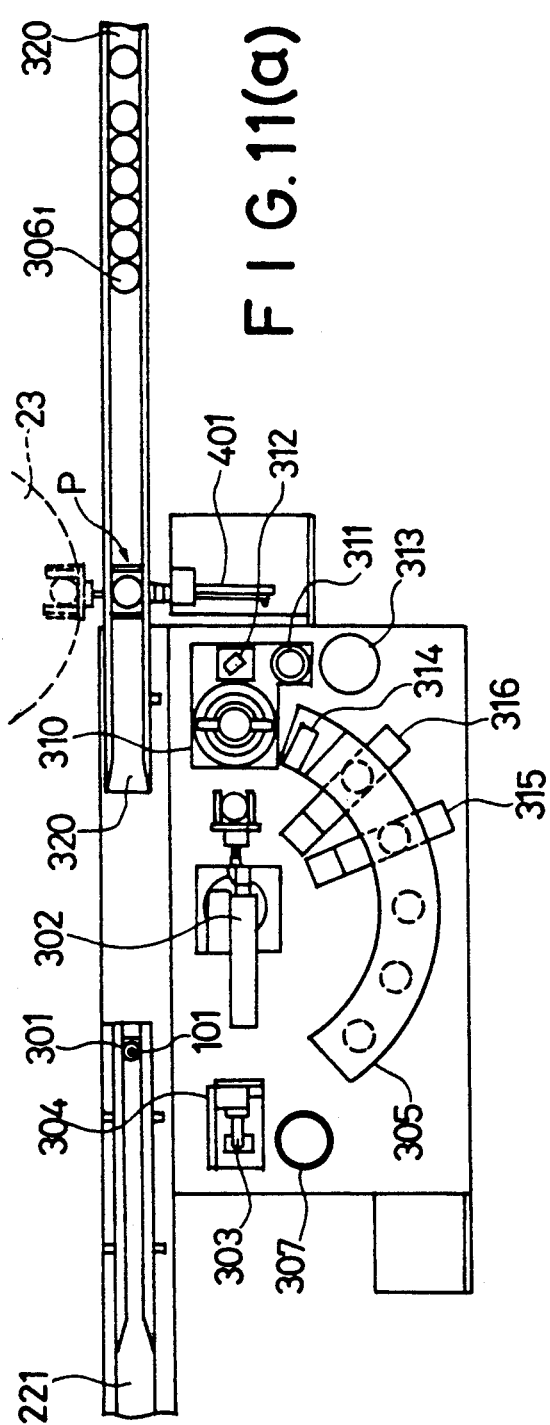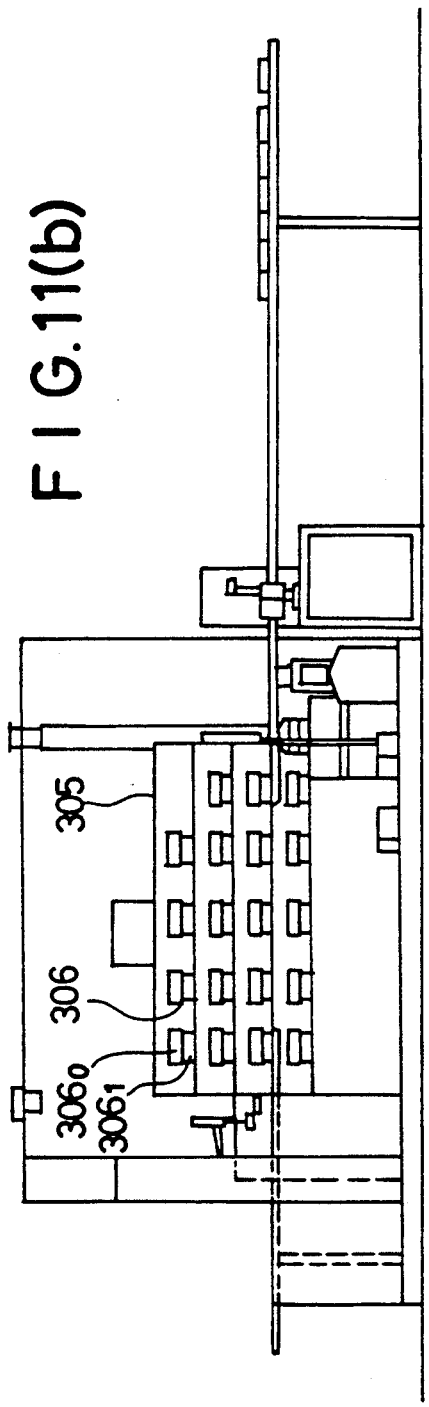
FIG.11(a)
FIG.11(b)

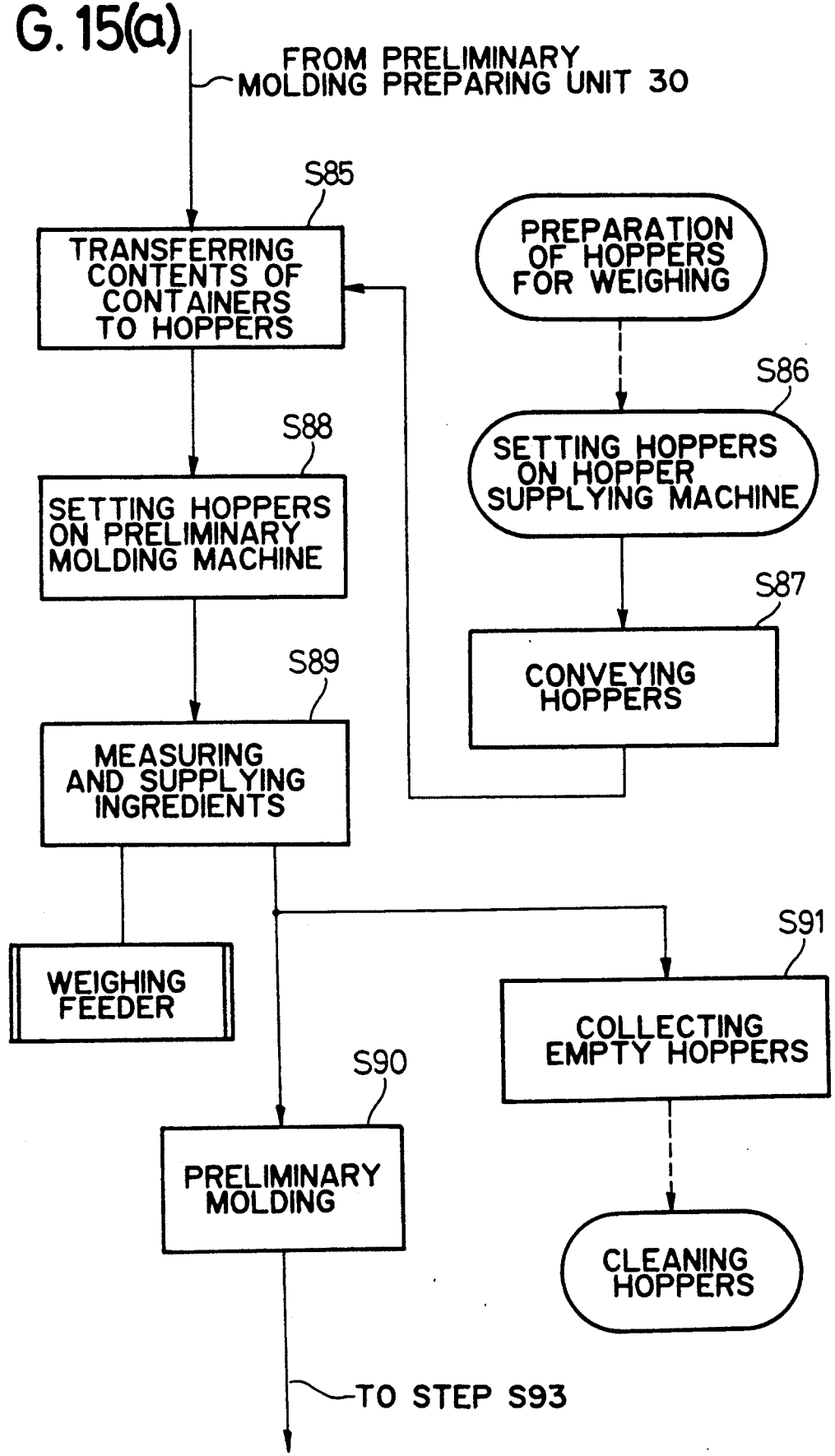

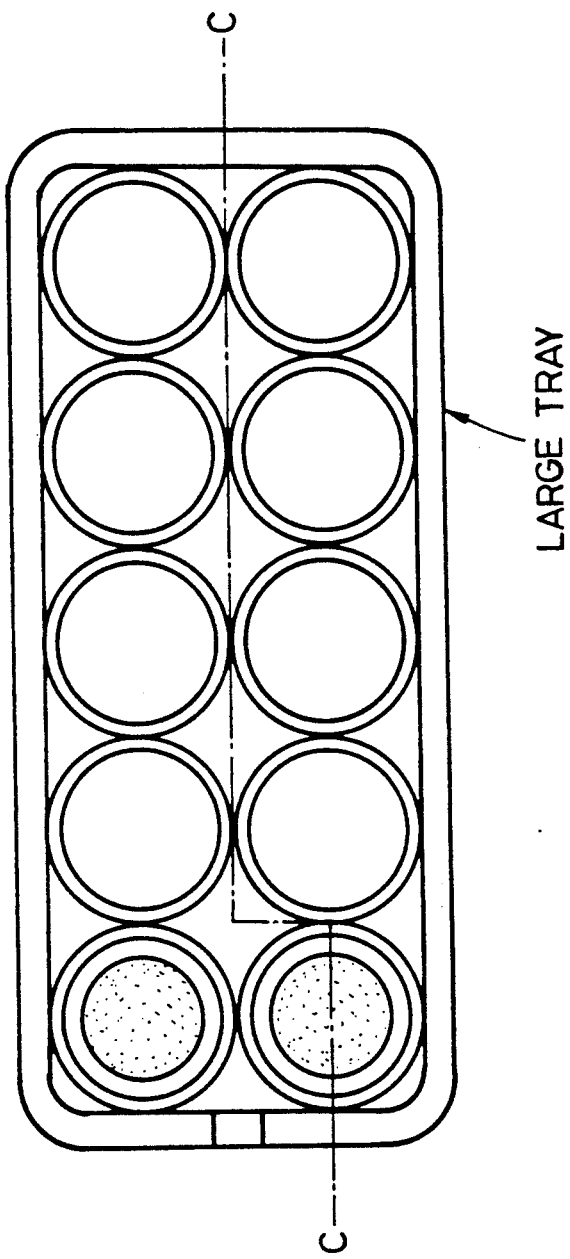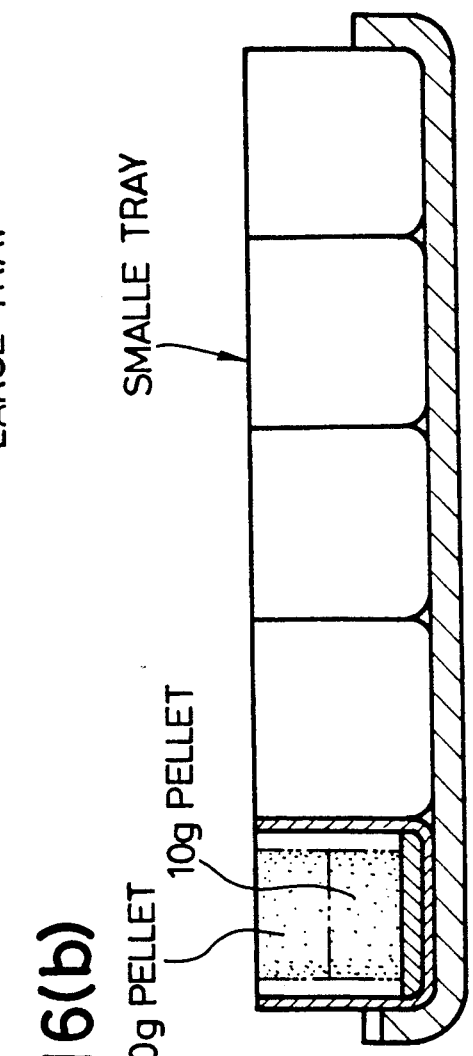
FIG.16(a)
FIG.16(b)

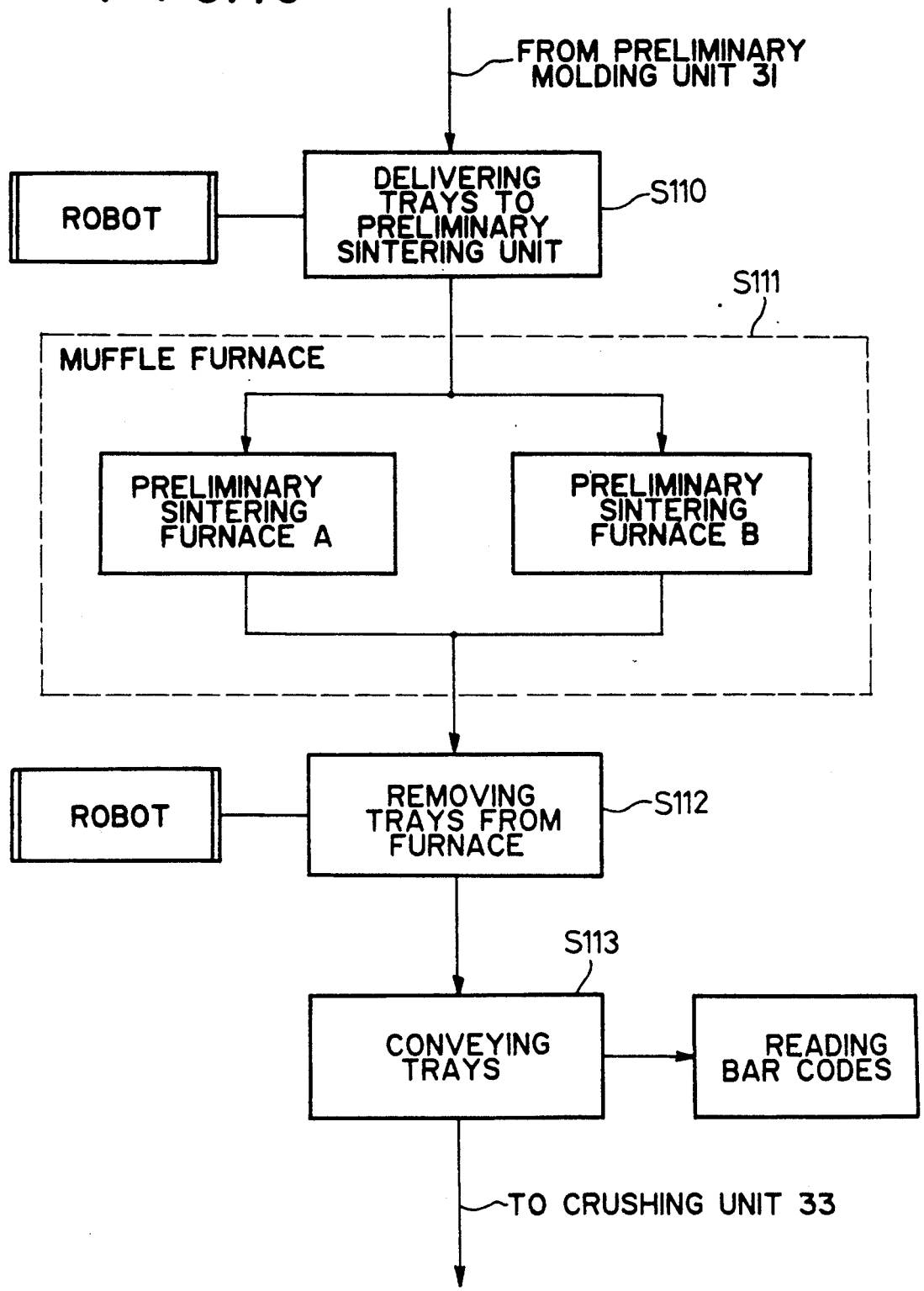

ly equal intervals, one of the roller shafts of each pair being rotated by a drive source, a pot containing a plurality of balls and powdery ingredients to be mixed, the pot being rotatably placed on the pair of roller shafts, and a moving device for relatively moving the drive source and the pot containing the ingredients toward and away from each other.

APPARATUS FOR MANUFACTURING MULTI-ELEMENT SINTERED MATERIAL

This application is a division of application Ser. No. 07/467,750, filed Jan. 19, 1990, now abandoned.

BACKGROUND OF THE INVENTION

1. Field of the Invention

The present invention relates to an apparatus for manufacturing a multi-element sintered material such as a superconducting ceramic material.

2. Description of the Prior Art

Heretofore, superconducting ceramic materials or the like have been manufactured by manually proportioning powdery ingredients with an electronic scale or the like, putting the proportioned ingredients into a sample pot, manually placing the sample pot on a pair of drive rollers of a drive device, rotating the sample pot by the drive device for a predetermined period of time to mix the ingredients, then molding the mixture into a sample of a certain shape, sintering the molded sample, preparing a test piece for testing the sintered sample and preserving the sample. Most of these manufacturing steps have been manually carried out.

However, the above manual process for preparing superconducting materials is disadvantageous for various reasons. If the number of samples to be prepared is increased, then a larger work force and a greater expenditure of time and money are required to produce the samples. The quality of the produced samples may vary depending on how skillful the work force involved in the preparation of the samples are, and errors may occur due to the increased number of samples.

The inventors achieved the present invention based on the belief that the aforesaid problems can be solved by automatically manufacturing multi-element sintered materials of various compositions, typically superconducting materials, each of uniform quality from powdery elements (raw material ingredients) with no or very little manual intervention.

SUMMARY OF THE INVENTION

It is an object of the present invention to provide an apparatus for automatically manufacturing a multi-element sintered material such as a superconducting ceramic material.

In other words, the object of the present invention is to manufacture a multi-element sintered material by automatically effecting steps of various kinds which would otherwise tend to affect the quality of the sintered material, the steps ranging from weighing and mixing predetermined amounts of powdery ingredients to preliminarily molding the mixture into a pellet, so that a large quantity of pellets of different kinds (compositions) can be efficiently manufactured without quality variations which would otherwise result from manual intervention.

Another object of the present invention is to automate various steps ranging from preliminarily molding a mixture into pellets to fully sintering the pellet, so that completed pellets of stable quality can be manufactured.

A further object of the present invention is to provide an apparatus for automatically proportioning powdery ingredients accurately in appropriate amounts, preparing the proportioned ingredients for mixing, and mixing the prepared ingredients.

According to the present invention, there is provided a method of manufacturing a multi-element sintered material, comprising automatically weighing and supplying powdery ingredients to make up a superconducting material into a pot fed by a conveyor (weighing step), automatically supplying a plurality of balls and a predetermined amount of volatile liquid into the pot, closing the pot with a lid which bears a first code, reading the first code on the lid and storing information of the first code and the ingredients supplied into the pot in corresponding relation to each other (preparing step for mixing), thereafter moving the pot to mix the ingredients therein (mixing step), opening the lid, removing the balls with a screen, transferring only the mixed ingredients into a receiver container which bears a second code, reading the second code, and storing information relative correspondence of the second code to the first code (ball-removing step), thereafter heating the receiver container to dry the ingredients therein (drying step), and preliminarily molding an amount of the dried ingredients preferably by pressing with a mold assembly into a sample and storing information on the ingredients of the sample in corresponding relation to the second code (preliminary molding step) using the apparatus of the present invention.

According to the present invention, there is also provided an apparatus for manufacturing a multi-element sintered material, comprising a horizontally movable horizontal weighing hopper table, a plurality of weighing hoppers disposed on the weighing hopper table at predetermined positions, vertically held thereon and detachably attached thereto, a moving device for horizontally moving the weighing hopper table while stopping the weighing hoppers successively at a first predetermined position, an electronic scale disposed directly below the first predetermined position, a drive device for driving the weighing hopper to cause the ingredient contained therein to drop out after each of the weighing hoppers is stopped in the first predetermined position, a pot supply/discharge device for supplying one sample pot at a time onto the electronic scale to store the ingredients dropped from each of the weighing hoppers at the first predetermined position, so that the ingredients stored in the sample pot is weighed by the electronic scale, and for discharging the sample pot in a first direction if the weights of the ingredients measured by the electronic scale agree with the indicated weights, or in a second direction if the weights of the ingredients measured by the electronic scale disagree with the indicated weights, a conveyor for feeding the sample pot discharged in the first direction to a subsequent process, a pot stopping device for stopping the sample pot fed by the conveyor at a second predetermined position, a liquid spraying and scattering device for detecting when the sample pot is stopped at the second predetermined position, scattering a volatile liquid uniformly into the stopped sample pot, thereafter releasing the sample pot and feeding the sample pot by a conveyor to a subsequent process, and a ball supply device for supplying a predetermined number of balls each covered with a resin layer into the sample pot while the sample pot is being stopped at the second predetermined position by the pot stopping device.

According to the present invention, there is further provided an apparatus for manufacturing a multi-element sintered material, comprising a plurality of pairs of roller shafts each comprising a pair of shafts and a frictional roller fitted over each shaft, preferably at substantially equally spaced intervals therealong, a support device on which the roller shafts are rotatably supported such that the roller shafts are grouped into said pairs with the rollers on the paired shafts being spaced from each other in confronting relation in each pair, the support device including an attachment frame on which the roller shafts are horizontally spaced equally, a robot hand, a vertical feeder for vertically moving the robot hand, the robot hand being mounted on the vertical feeder, a horizontal orthogonal feeder for moving the vertical feeder over the roller shafts supported on the frame to cause the robot hand to supply a cylindrical sample pot onto the confronting rollers of a pair of roller shafts and also to cause the robot hand to feed a cylindrical sample pot from the rollers of a pair of roller shafts to a next process, a drive device for rotating each pair of roller shafts preferably by rotating one of each pair of roller shafts to rotate both roller shafts through an idle gear therebetween, and a rotating pot holding device for holding the sample pot in position when the sample pot is rotated by each pair of rollers of the roller shafts after being supplied onto the pair of rollers.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is perspective view of a mixing unit (ball mill type);

FIG. 7(a), 7(c), and 7(d) are plan, front elevational, and side elevational views of the mixing unit shown in FIG. 6;

FIG. 8 is a flowchart showing operation of a robot of the mixing unit;

FIG. 9 is a flowchart showing the steps of operation of a separation preparing unit;

FIG. 10 is a flowchart showing the steps of operation of a ball separating unit;

FIGS. 11(a) and 11(b) are plan and side elevational views, respectively, of the separation preparing unit and the ball separating unit;

FIG. 15(a) and 15(b) are flowcharts showing the steps of operation of a preliminary molding unit;

FIG. 16(a) is a plan view of a tray;

FIG. 16(b) is a cross-sectional view taken along line C—C of FIG. 16(a);

FIG. 18 is a flowchart showing the steps of operation of a preliminary sintering unit;

DETAILED DESCRIPTION OF THE PREFERRED EMBODIMENTS

Figure 1:
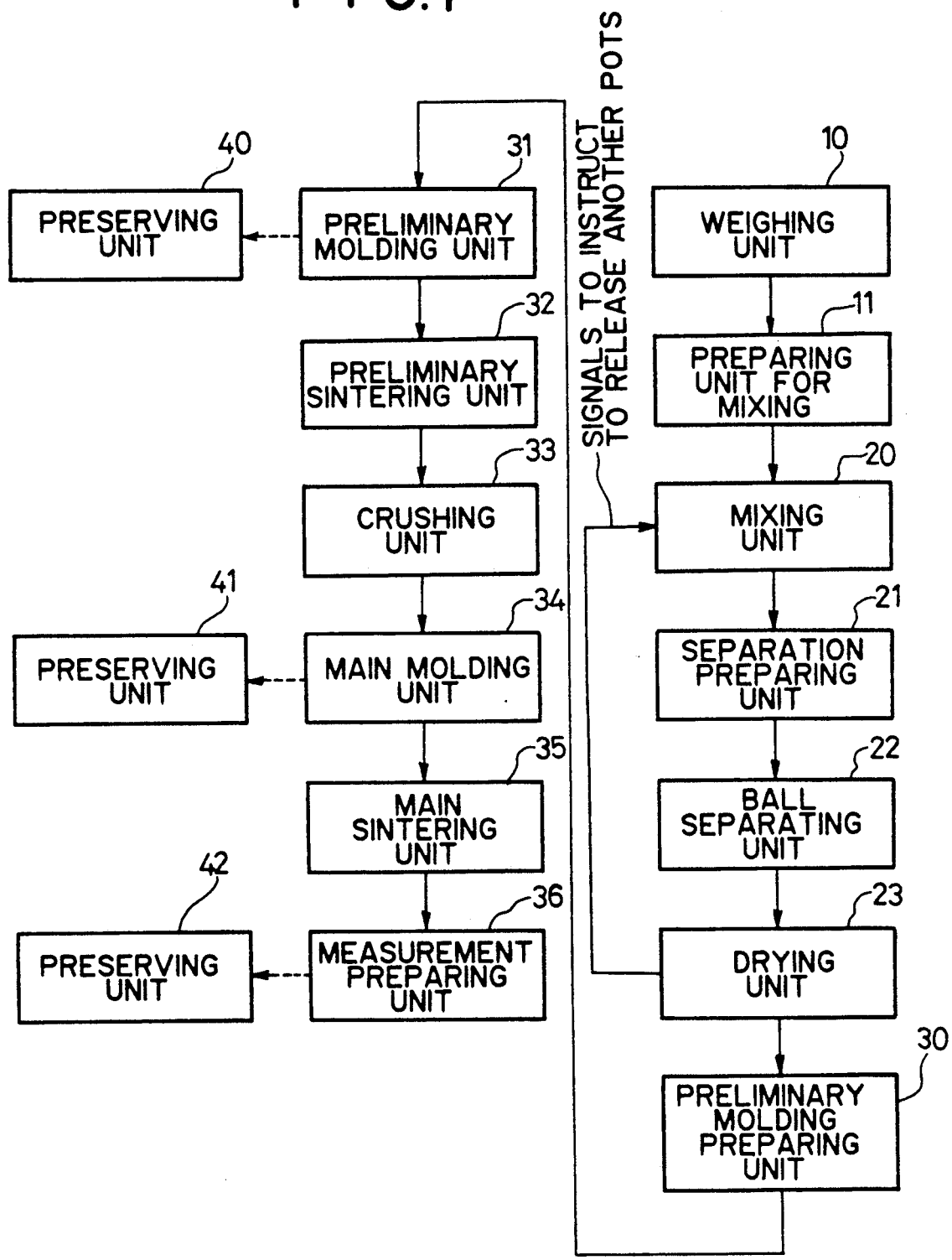
FIG. 1 is a block diagram of a system incorporating apparatuses according to a first embodiment of the present invention for carrying out the method of manufacturing a multi-element sintered material according to the present invention.
Figure 2:
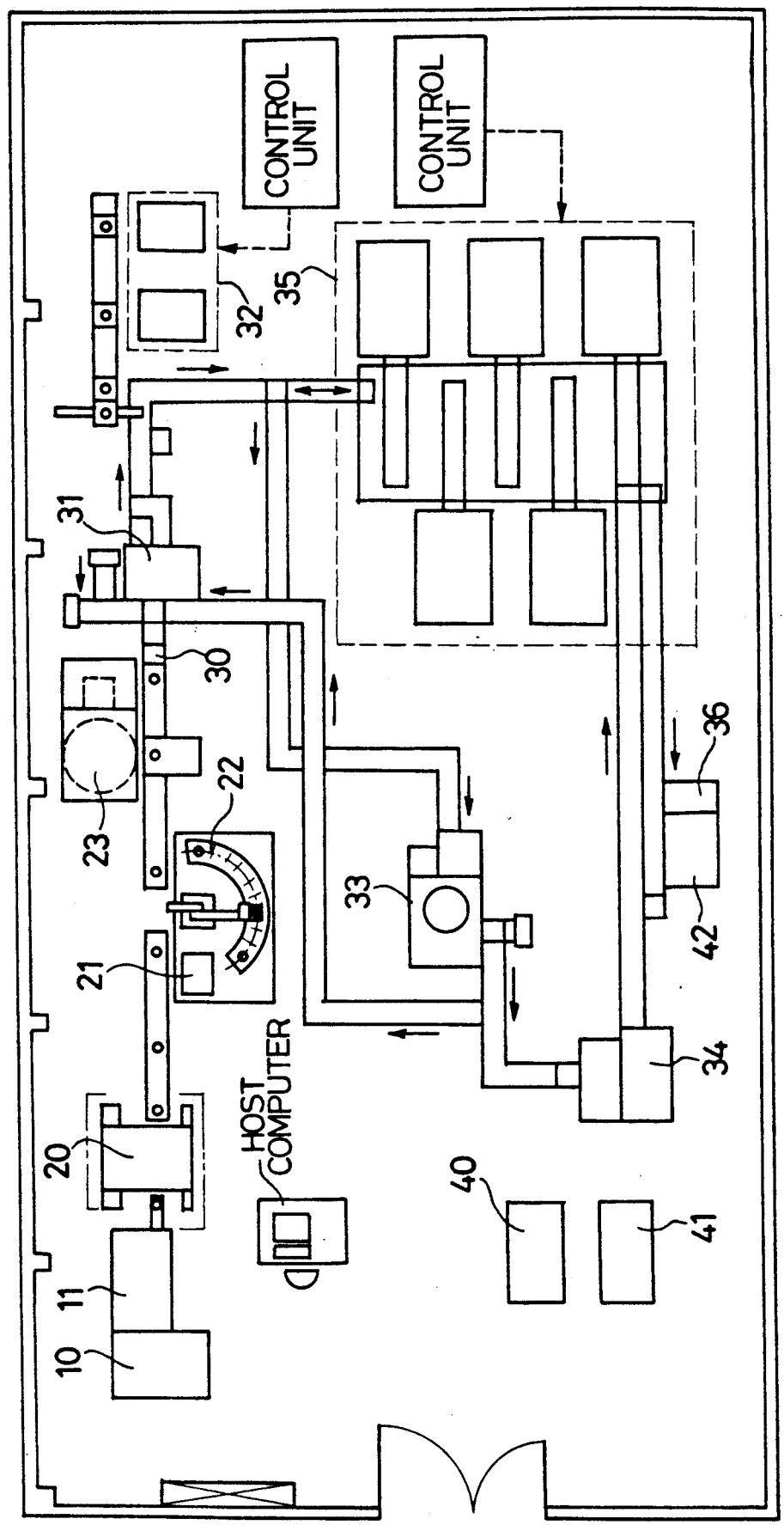
FIG. 2 is a schematic plan view of the system shown in FIG. 1.

FIGS. 1 and 2 show a system incorporating apparatuses and steps for carrying out a method of manufacturing a multi-elements sintered material, typically a superconducting material, from a plurality of powdery ingredients.

Figure 3:
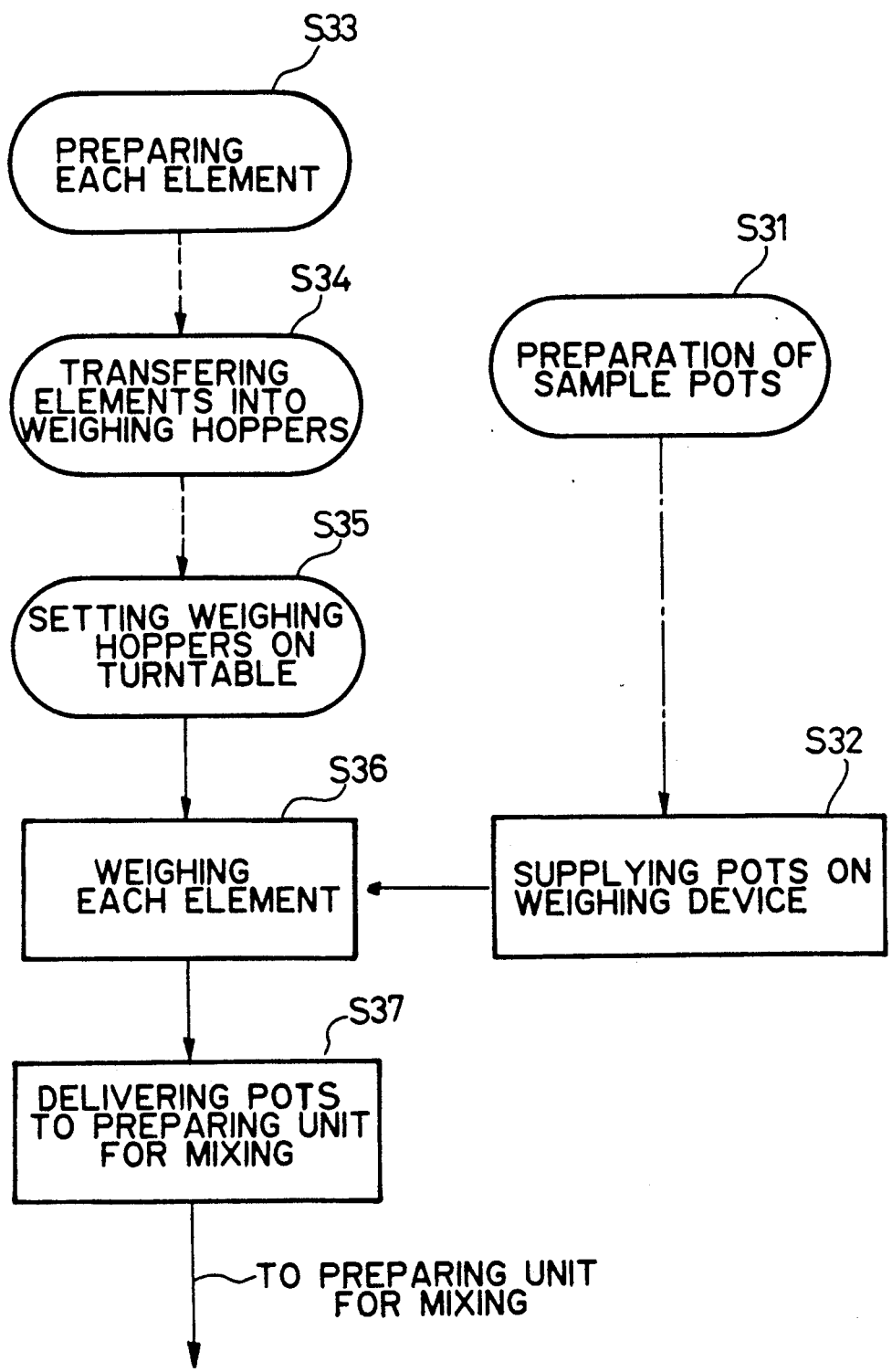
FIG. 3 is a flowchart showing the steps of operation of a weighing unit.

The system has a weighing unit 10 and a preparing unit 11 for mixing. The weighing unit 10 and the preparing unit 11 for mixing will first be described below with reference to FIGS. 3, 4, and 5.

The weighing unit 10 operates as follows: A sample pot 101 in the form of a cylindrical can-like container with a lid removed therefrom is prepared in a step S31 (FIG. 3), and supplied to a multi-element powdery ingredient weighing device by a pot supply conveyor 102 in a step S32. Powdery ingredients of different elements which have been prepared and stored in different containers are transferred from the containers into different weighing hoppers $109_1$, $109_2$, ..., $109_8$, in steps S33, S34. The powdery ingredients may be those which will make up a superconducting material. Then, the weighing hoppers are set on a turntable 108 of the multi-element powdery ingredient weighing device in a step S35. Thereafter, the ingredients are weighed and supplied in a step S36 to the sample pot 101, which is then delivered into the preparing unit 11 for mixing in a step S37.

Figure 5:
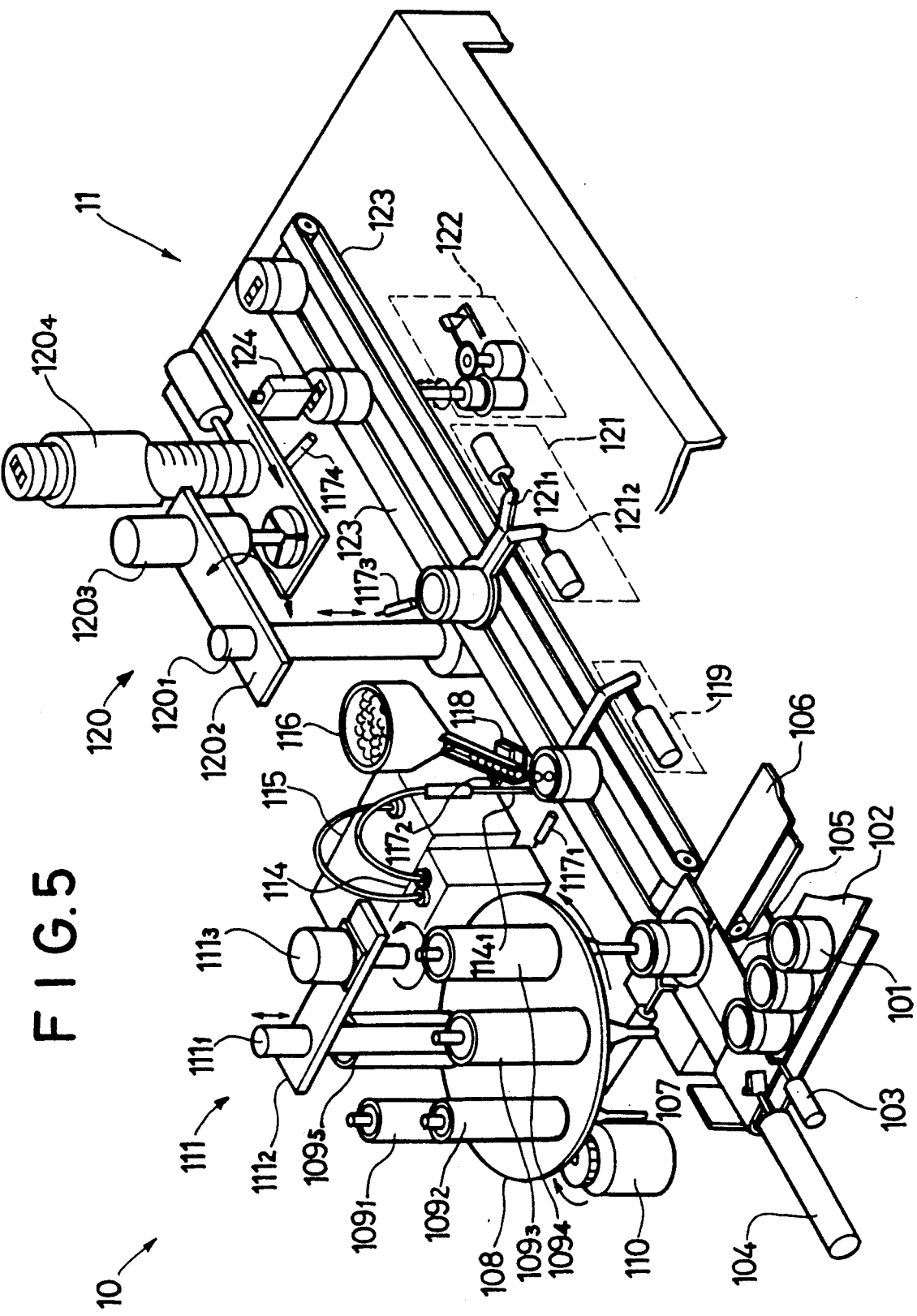
FIG. 5 is a fragmentary perspective view of the weighing unit and the preparing unit for mixing.
Figure 7A:
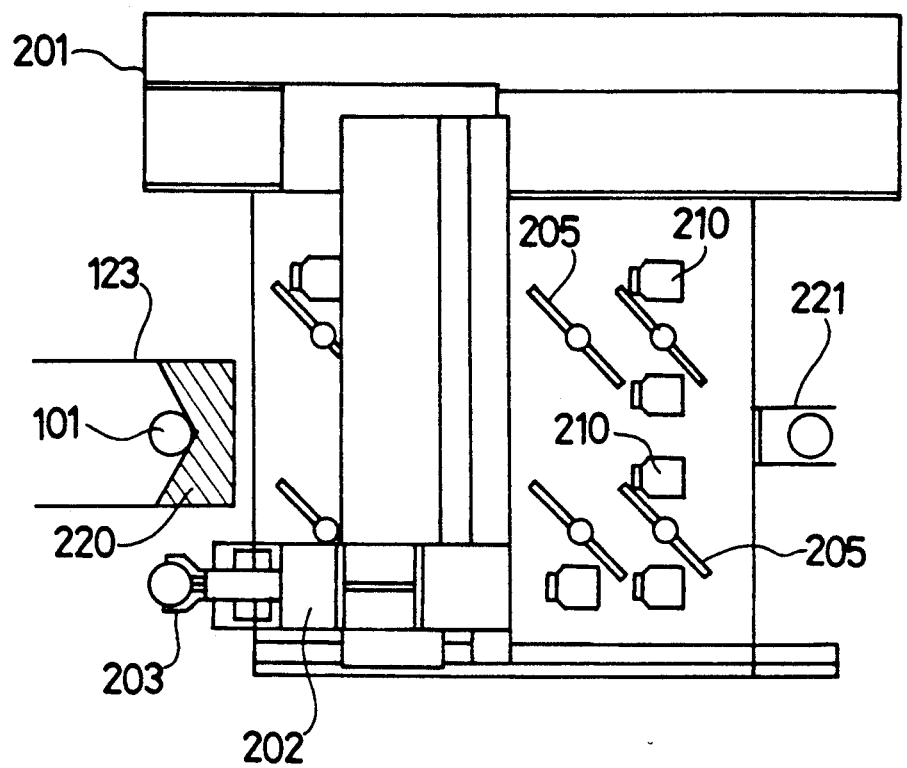
Figure 7B:
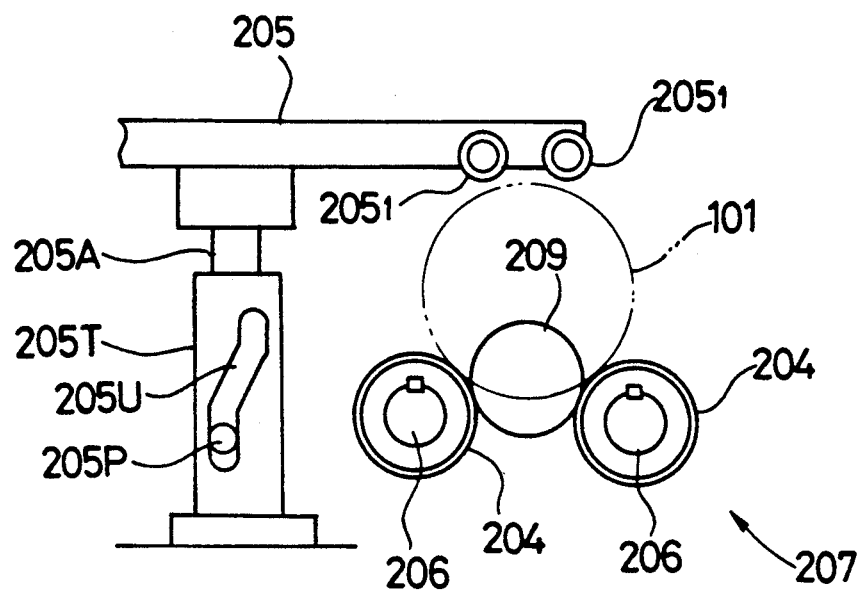
FIG. 7(b) is an enlarged fragmentary view of the mixing unit.
Figure 7D:
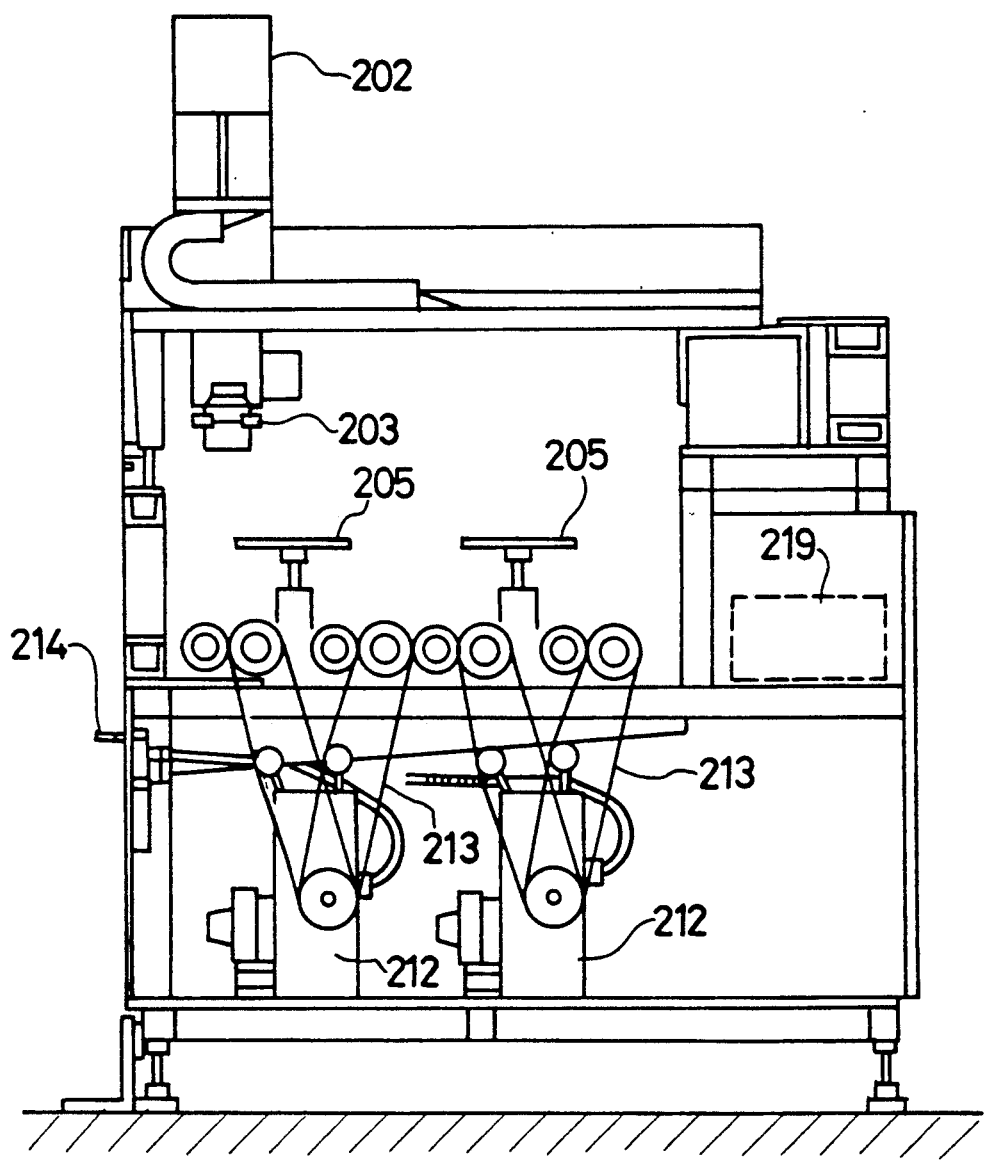

The weighing process in the step S36 will be described in detail below with reference to FIG. 5. The sample pot 101 with no lid on its upper open end has been fed by the pot supply conveyor 102, and is stopped by a stopper 103. An electronic weighing device 105, which is the multi-element powdery ingredient weighing device referred to above, is disposed in a first predetermined position below the turntable 108. If there is nothing placed on the electronic weighing device 105, then a sample pot 101 is released from the stopper 103 and fed onto the electronic weighing device 105 by a double-stage feed cylinder 104 under a command from a controller (not shown). When the controller produces an accepting signal indicating that the measured weight is acccepted, the cylinder 104 pushes the sample pot 101 onto a main conveyor 123 having two parallel conveyor belts. When the controllers produces a rejecting signal indicating that the measured weight is not accepted, another cylinder 107 pushes the sample pot 101 onto a rejecting conveyor 106 which delivers the sample pot 101 onto a rejecting conveyor 106 which delivers the sample pot 101 into a reject container (not shown).

The weighing hoppers $109_1, 109_2, \ldots, 109_8$ are positioned radially outward from the center of the turntable 108, preferably equidistant from the center of the turntable, preferably at angularly equally spaced locations thereon. Each of the weighing hoppers has a central vertical shaft disposed therein. When the central shaft, preferably in a brush like structure, or a screw feeder structure, or the like, of each weighing hopper moves, preferably rotates to a certain angle, vibrates or move with a like motion, the powdery ingredient contained in the weighing hopper is dropped downward from the weighing hopper through the turntable 108 in an amount commensurate with the angle or amount of the movement by which the central shaft has rotated or moved. The weighing hoppers have different sizes depending on the ingredients to be supplied thereto. However, the turntable 108 is designed such that a weighing hopper of any size can be placed in each location thereon. The turntable 108 is angularly moved by a turntable rotating device 110 under the control of the controller to bring and stop the weighing hoppers successively in (or above) the first predetermined position in which the electronic weighing device 105 is disposed.

A hopper actuator device 111 comprises a central pole $111_1$ coaxial with the turntable 108, an arm $111_2$ fixed to and extending radially outward from the central pole $111_1$, and an actuator $111_3$ fixedly mounted on the radially outer end of the arm $111_2$. The hopper actuator device 111 is controlled by the controller such that each time a weighting hopper is stopped in the first predetermined position, the central pole $111_1$ is lowered to bring the actuator $111_3$ into engagement with the stopped weighing hopper, and the actuator $111_3$ is operated to turn or move the central shaft of the weighing hopper by a prescribed angle or amount of movement. The ingredient contained in the weighing hopper then falls from the weighing hopper through the turntable 108 and leg of the hopper in an amount commensurate with the angle or amount of movement, by which the central shaft of the weighing hopper has turned or moved, into the sample pot 101 on the electronic weighing device 105. The ingredient thus supplied to the sample pot 101 is weighed by the electronic weighing device 105, and the weighed value is compared with a predetermined weight value by the controller. The above process of supplying an ingredient from the weighing hoppers and weighing the supplied ingredient is repeated until all the ingredients are supplied to the sample pot 101 and weighed by the electronic weighing device 105. If the weights of the ingredients supplied from the weighing hoppers fall within predetermined weight ranges, then the controller generates an accepting signal. If the weights do not fall within the predetermined weight ranges, then the controller generates a rejecting signal.

In the event that an ingredient is charged excessively into the sample pot 101, however, the controller produces commands enabling the weighing hoppers to supply those ingredients to be weighed after the excessively charged ingredient, in amounts that are with an excess proportional to the excess of the excessively charged ingredient. The controller also produces commands enabling the weighing hoppers to supply additional amounts of those ingredients weighed before the excessively charged ingredient, the amounts also being proportional to the excess of the excessively charged ingredient. Therefore, the controller can reduce wasteful loss of ingredients which would otherwise be caused if a rejecting signal were produced by the controller without such correction.

The preparing unit 11 for mixing will be described below.

Figure 4:
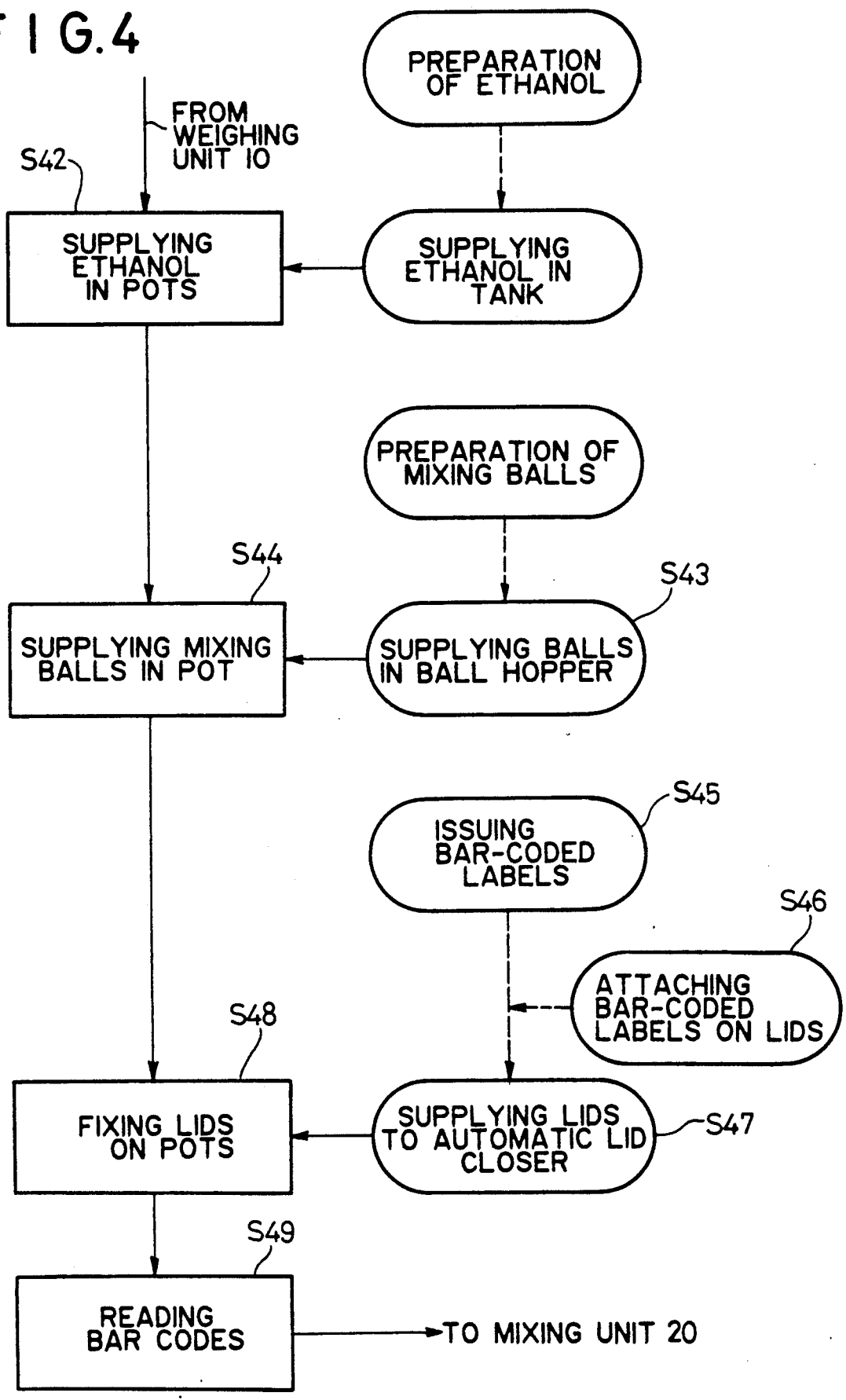
FIG. 4 is a flowchart showing the steps of operation of a preparing unit for mixing.

As shown in FIG. 4, a liquid alcohol is prepared and supplied to a tank 115 in a step S41. Mixing balls are prepared and supplied to a ball hopper in a step S43. A bar code is issued by a bar code issuing machine in a step S45, and a lid is prepared and the bar code is applied to the lid in a step S46. The lid is then supplied to a lid stocker $120_4$, (FIG. 5) of an automatic lid closing machine or robot 120 in a step S47.

The sample pot 101 containing the ingredients which have been successfully weighed by the weighing unit 10 is delivered to the mixing preparing unit 11 while the bottom of the sample pot 101 is being supported by and on the two belts of the main conveyor 123. The sample pot 101 is stopped in a second predetermined position by a stopper 119, whereupon a step S42 is started. More specifically, the controller detects through a position sensor 117 when the sample pot 101 has come to the second predetermined position. The controller then instructs a metering device 114 to supply a slight squirt of an alcohol, typically ethanol, from the tank 115 into the sample pot 101. The metering device 114 also gives another supply of alcohol when instructed again by the controller. When the first squirt of alcohol is finished, the controller instructs a ball-stopper 118 to release a certain number of balls from the ball hopper 116 into the sample pot 101 in a step S44. When a sensor $117_2$ detects that these balls have been dropped into the sample pot 101, the controller actuates the stopper 118 to block the supply of balls from the ball hopper 116 into the sample pot 101.

After the balls have been supplied to the sample pot 101, a second squirt of alcohol is supplied from the metering device 114 to the sample pot 101. When the supply of the second squirt of alcohol is over, the controller operates the stopper 119 to release the sample pot 101. The first squirt of alcohol dampens the powdery ingredients in the sample pot 101 to the extent that the ingredients and the added alcohol will be prevented from being raised and scattered around when the balls are dropped into the sample pot 101. It is preferable to spray the first squirt of alcohol uniformly over the powdery ingredients.

The sample pot 101 is moved from the second predetermined position by the main conveyor 123, and stopped in a third predetermined position by a lever $121_1$ of a positioning/fixing device 121. The controller detects through a position sensor $117_3$, when the sample pot 101 is stopped in the third predetermined position, after which a lever $121_2$ of the positioning/fixing device 121 is moved from a position off the main conveyor 123 into a position over the main conveyor 123 to clamp the sample pot 101 in cooperation with the lever $121_1$. When the controller detects the full clamping of the sample pot 101, it starts a lid closing process in a step 48 by initiating operation of the lid closing robot 120. The lid closing robot 120 has a central pole $120_1$, an arm $120_2$, fixed to the central pole $120_1$, a lid closer $120_3$ mounted on the distal end of the arm $120_2$, and the lid stocker $120_4$ for supplying lids with bar codes prepared in steps S46 and S47, one at a time, to the lid closer $120_3$. The lid closing robot 120 instructs the lid stocker $120_4$ to supply one of the lids at a time to a position directly below the lid closer $120_3$. When a lid is supplied below the lid closer $120_3$ in a step S47, the lid closing robot 120 lowers the central pole $120_1$ to cause three radial fingers on the lower end of the lid closer $120_3$ to grip the lid. The lid closing robot 120 then rotates the central pole $120_1$ until the lid closer $120_3$ is brought to a position directly above the third predetermined position, and lowers the central pole $120_1$. The lid closer $120_3$ rotates the lid to fasten the same to the upper end of the sample pot 101, whereafter the fingers are released from the lid in a step S48. The central pole $120_1$ is elevated and rotated to return the lid closer $120_3$ to its original position. After the lid has been closed, the levers $121_1$, $121_2$ of the positioning/fixing device 121 are opened, i.e., swung away from each other, and the sample pot 101 with the lid secured thereto is further fed by the main conveyor 123. After the sample pot 101 has moved past the lever $121_1$, the lever $121_1$ is brought back onto the main conveyor 123.

When the thus lid covered sample pot 101 has reached a fourth predetermined position, a position sensor $117_4$ applies a signal to the controller which now starts a step S49. More specifically, a rotating device 122 moves a shaft upward between the two belts of the main conveyor 123 to lift the sample pot 101, and rotates the sample pot 101 off the main conveyor 123. The bar code applied to the lid on the sample pot 101 is now read by a suitable reading means such as a bar code reader 124. Thereafter, the sample pot 101 is placed on the main conveyor 123 again, and delivered to a subsequent process. The bar code corresponds to information about the ingredients and amounts thereof (compositions) stored in each specific sample pot 101, and the information read by the bar code reader 124 is sent to the controller and recorded in a suitable manner.

The sample pot 101 is preferably of a shouldered structure such that the top opening or port thereof is smaller in diameter than the barrel portion of the sample pot, the sample pot 101 being thus tapered from the barrel portion toward the opening thereof. The shouldered structure is advantageous in that the ingredients will not flow (leak) out of the sample pot 101 when they are mixed by rotating the sample pot 101 while it is lying in a horizontal position.

The inner surfaces of the ball hopper 116, the sample pots 101, and the lids, and the outer surface of the balls are preferably covered by one of certain various synthetic resin such as polyethylene, polypropylene, fluoroplastic, and polyimide, so that the ingredients, which are of various minerals, are less contaminated, even though by fine particles of the synthetic resins, than if these inner surfaces were made of metal or ceramic materials and not covered by the resin. While the turntable 108 is employed in the illustrated embodiment, a linearly movable table may be employed for successively moving the weighing hoppers.

The system shown in FIGS. 1 and 2 also includes a mixing unit 20. The mixing unit 20 will be described with reference to FIGS. 6 and 7(a) through (d).

The mixing unit 20 has a mixing device. The mixing device is constructed as follows:

The mixing device has a plurality of roller shafts 207 each comprising a shaft 206 and a plurality of substantially equally spaced rollers 204 each having a surface layer of rubber. The opposite ends of each of the roller shafts 207 are supported on a frame 211 by bearings 208. The roller shafts 207 are grouped into pairs, and the rollers 204 on the paired roller shafts 207 are spaced a substantially constant distance from each other in confronting relation. The mixing device also includes a horizontal orthogonal feeder 201 and a vertical feeder 202 with a robot hand 203 mounted thereon. The horizontal orthogonal feeder 201 moves the vertical feeder 202 in perpendicular X- and Y-axes over the roller shafts 207. The mixing device also has a plurality of holder clamps 205 disposed above the roller shafts 207. When a sample pot 101 is placed on a pair of confronting rollers 204 by the robot hand 203 so as to be rotated by these rollers 204, a holder clamp 205 is rotated and lowered to prevent the sample pot 101 from being displaced out of position, with two holder rollers $205_1$ on the holder clamp 205 being positioned above the sample pot 101. While the sample pot 101 is in normal position on the rollers 204 on rotation, the holder rollers $205_1$ are preferably kept out of contact with the sample pot 101. However, when the sample pot 101 jumps upward, it is contacted by the holder rollers $205_2$ and prevented from being displaced out. This arrangement is advantageous in that the drive power for rotating the roller shafts 207 is subject to a reduced power loss.

One of the paired roller shafts 207 is driven by a drive device 212 through a bolt 213, whereas the other roller shaft 207 is driven by an idler gear 209 disposed between the rollers 204 or the shafts 206. When the paired roller shafts 207 are thus rotated, the sample pot 101 on the rollers 204 is rotated to mix the powdery ingredients contained in the sample pot 101. Each drive device 212 includes an electric motor and an infinitely variable transmission. The speed of rotation of the drive device 212 can be adjusted by a speed adjusting handle 214. The horizontal orthogonal feeder 201 is controlled by a controller 219 according to a program.

In this embodiment, there are four sets or pairs of roller shafts 207, and each pair of roller shafts 207 can rotate five sample pots 101 at a time. Sample pots 101 supported on the rollers shafts 207 are therefore arranged in a substantially square pattern which minimizes the distance that the robot hand 203 traverses.

The mixing unit 20 with the above mixing device operates as follows:

A sample pot 101 delivered from the mixing preparing unit 11 by the main conveyor 123 reaches a stopper 220. When the arrival of the sample pot 101 at the stopper 220 is detected by a position sensor associated with the stopper 220, the position sensor sends a signal to the controller 219 which instructs the robot hand 203 to grip the sample pot 101 and also instructs the horizontal orthogonal feeder 201 and the vertical feeder 202 to bring the gripped sample pot 101 to a position over a pair of confronting rollers 204 with nothing thereon in a step S51 (FIG. 8). The roller shafts 207 with those confronting rollers 204 are stopped against rotation, and then the sample pot 101 is placed on the rollers 204 by the robot hand 203, which is thereafter lifted back. While the sample pot 101 is being brought over the rollers 204, the robot hand 203 is rotated through 90° to turn the sample pot 101 until the axis of the pot is turned from the vertical position to the horizontal position parallel to the axes of the rollers 204. After the robot hand 203 has placed the sample pot 101 on the rollers 204 and before the robot hand 203 grips a next sample pot 101 at the stopper 202, the robot hand 203 is turned back through 90° so that it can grip the vertically positioned next sample pot 101 on the main conveyor 123. After the robot hand 203 has been elevated, the holder clamp 205 is lowered and rotated to bring the holder rollers 205₁ over the sample pot 101 so that the sample pot 101 will not jump off. Then, the drive device 212 is started to rotate the roller shafts 207 and hence the sample pot 101 to mix the ingredients therein with the aid of the balls also therein in a step S52. After the sample pot 101 has been rotated by the rollers 204 for a predetermined period of time, the holder clamp 205 is lifted and rotated to release the sample pot 101. The robot hand 203 is moved again to the position over the sample pot 101, grips the sample pot 101, and carries the sample pot 101 onto a discharge conveyor 221 in a step S53.

The holder clamp 205 is movable vertically and rotatable horizontally by a clamp shaft 205A fitted in a support cylinder 205T, a guide pin 205P attached to the clamp shaft 205A, a guide slot 205U defined in the support cylinder 205T and receiving the guide pin 205P, and a means (not shown) for vertically moving the clamp shaft 205A.

A separation preparing unit 21 and a ball separator unit 22 will be described below with reference to FIGS. 9 through 12.

The sample pot 101 is transferred from the mixing unit 20 by the discharge conveyor 221 in a step S61 (FIG. 9). When the sample pot 101 is detected by a pot sensor 301 (FIG. 11(a), a robot 302 grips the sample pot 101 and sets the sample pot 101 on an automatic lid opener 303 of the separation preparing unit 21. Then, the bar code on the lid of the sample pot 101 is read by a bar code reader 304 in a step S62. The information thus read from the bar code is stored in a controller (not shown), and its correspondence to a bar code on a receiver container of the ball separator unit 22 is recorded. In the automatic lid opener 303, the sample pot 101 is detected by a position sensor, and fixed in place by a pot fixing device under the control of the controller. Fingers of the automatic lid opener 303 are lowered, chucks the lid of the sample pot 101, rotates the lid back to remove the lid off the sample pot 101 in a step S63. In the step S63, the fingers of the automatic lid opener 303 are elevated and turned, while holding the lid, and are moved apart above a lid collecting container 307 to drop the lid into the lid collecting container 307. Thereafter, the lid is processed in a step S64.

The ball separator unit 22 has a shelf 305 supporting vertically separable assembled receiver containers 306 which have been delivered by a feed robot (not shown). Each of the receiver containers 306 comprises an upper screen 306₀, and a lower container 306₁ with a heat-resistant bar code applied thereto. Another assembled receiver container 306 which has been delivered from the shelf 305 by the robot 302 is also placed on a vibratory table 310. When the receiver container 306 is set on the vibratory table 310, the bar code of the container 306₁ thereof is read by a bar code reader 314 in a step S65.

After the lid is removed from the sample pot 101 by the lid opener 303, the robot 302 takes the sample pot 101 from the lid opener 303 and moves the sample pot 101 into the ball separator unit 22 in a step S66. The robot 302 turns the sample pot 101 upside down above the assembled receiver container 306 on the vibratory table 310 to dispose the ingredients into the receiver container 306 in a step S67. A washing nozzle 312 of a washing device 311 is introduced into the open end of the reversed sample pot 101 held by the robot 302, and ejects a spray of an alcohol from a tank 313 to wash the interior of the sample pot 101. Thereafter, the washing nozzle 312 is retracted out of the sample pot 101, which is allowed to drop into a pot retrieval container 315 in a step S70. In a step S68, an upper lid (screen-cover) is lowered onto the receiver container 306 to close the same, and the vibratory table 310 starts vibrating the receiver container 306. A spray of an alcohol is ejected from a spray nozzle (not shown) on the upper lid over the screen of the receiver container 306 for a given period of time to wash the screen in a step S69. After the vibratory table 310 stops vibrating the receiver container 306 and the spray nozzle is inactivated, the lower container 306₂ of the receiver container 306 is fixed in position by a fixing device. The robot 302 removes the upper screen from the receiver container 306, throws the balls into a ball collecting container 316, and returns the upper screen back to the shelf 305 in a step S71. The lower container 306₁ is released from the fixing device, and fed onto a conveyor 320 by the robot 302 for a subsequent process in a step S72.

A drying unit 23 will be described with reference to FIGS. 11, 12, 13(a), and 13(b).

Figure 12:
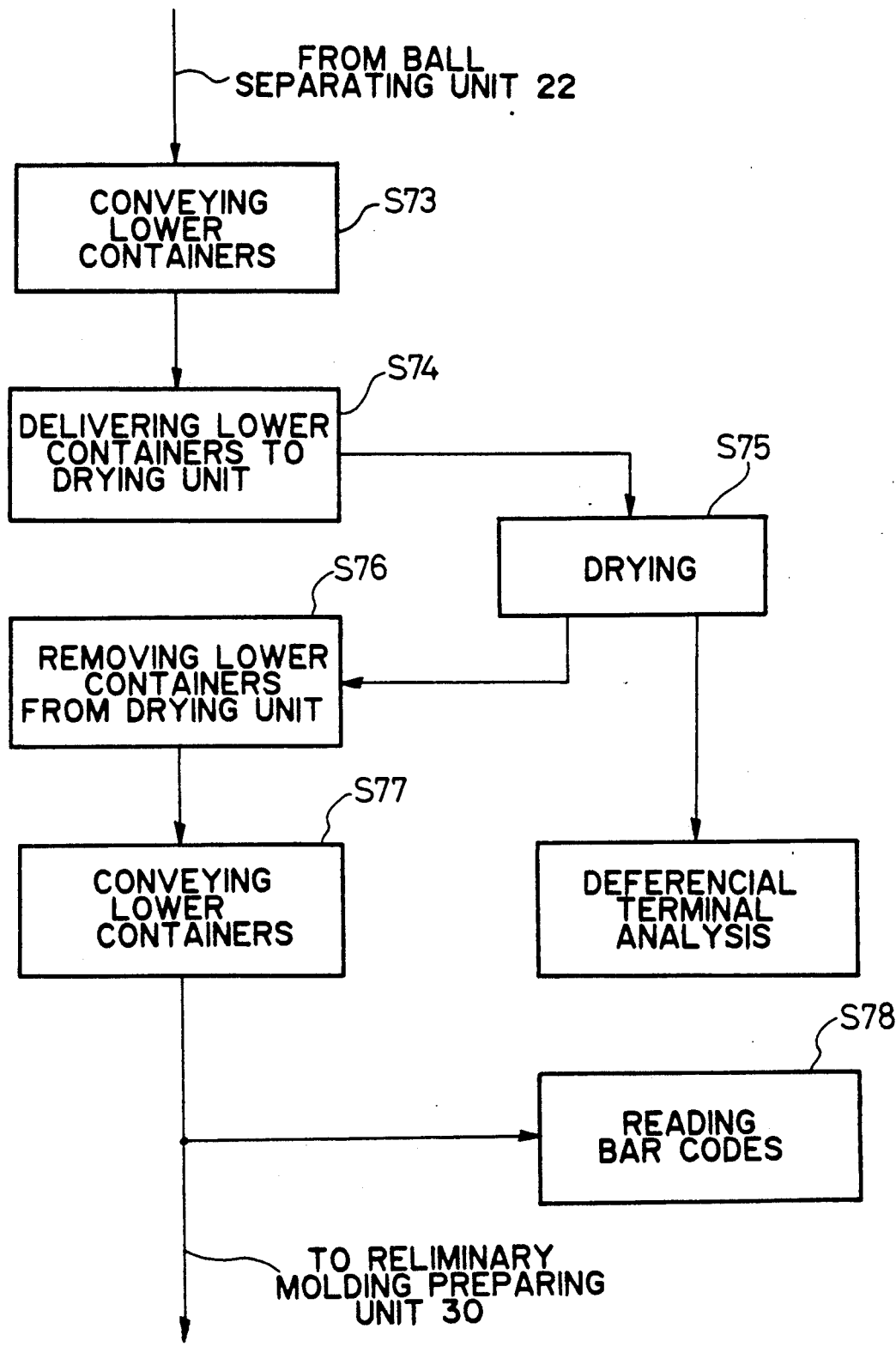
FIG. 12 is a flowchart showing the steps of a drying unit.
Figure 13A:
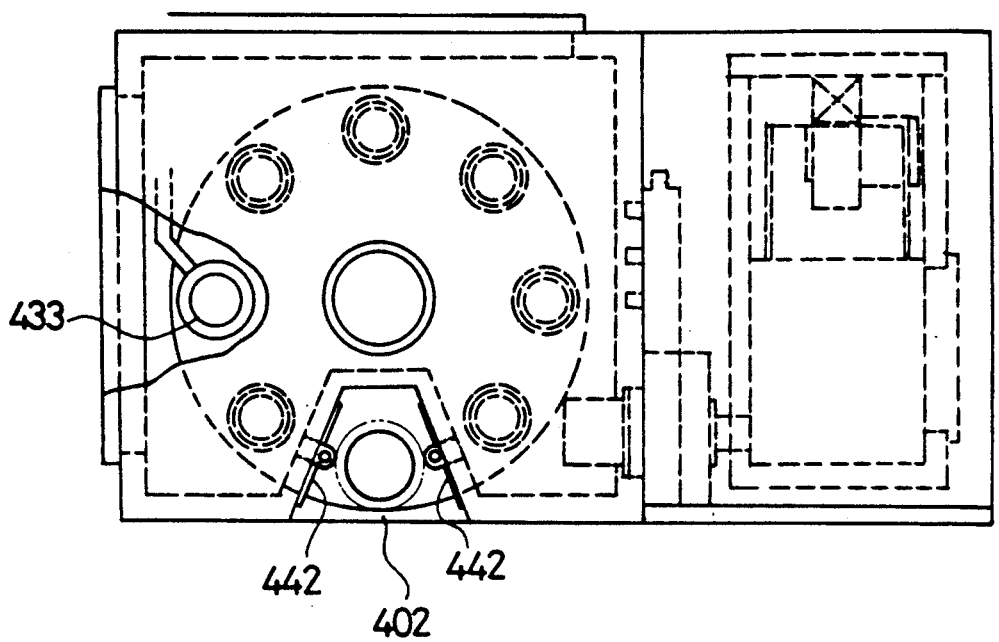
FIGS. 13(a) and 13(b) are plan and side elevational views, respectively, of the drying unit.
Figure 13B:
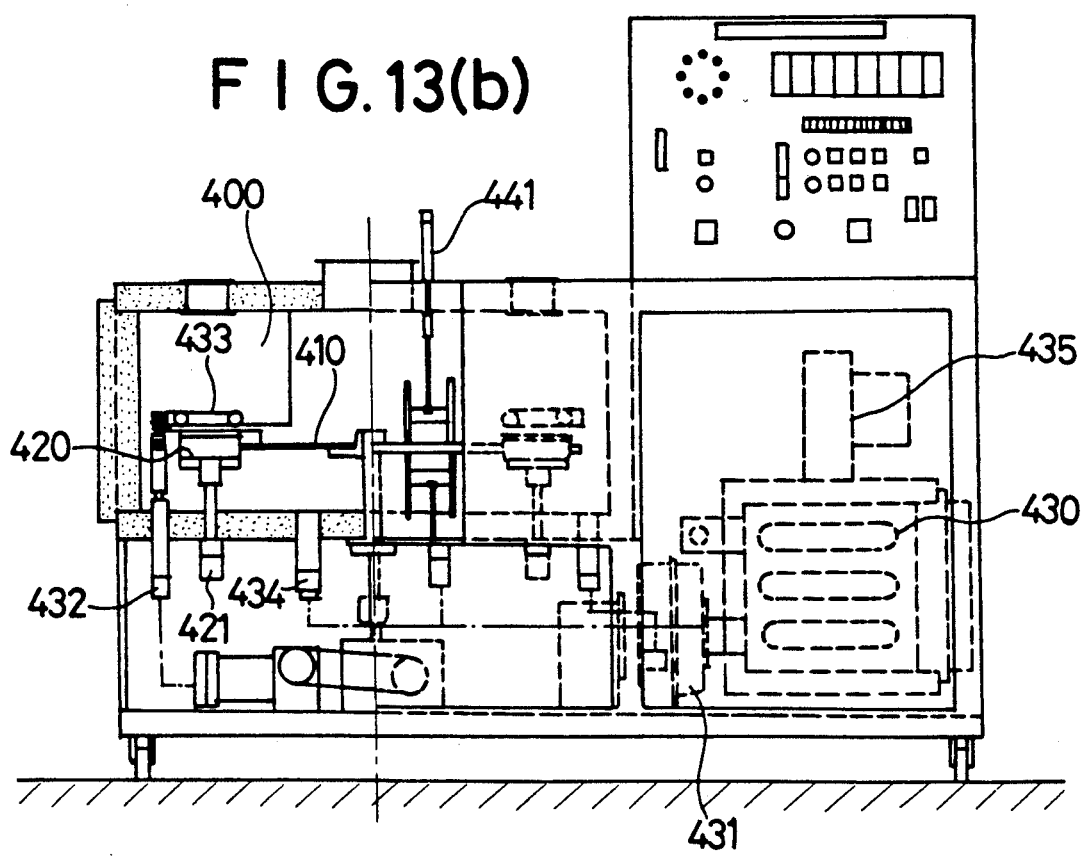

The lower container 306₁ is moved from the robot 302 by the conveyor 320 (FIG. 11) to a position P and positioned in a step S73 (FIG. 12). The positioned container 306₁ is then fed into an inlet/outlet port 402 in the drying unit and set in a hole in a turntable 410 by a robot 401 in a step S74. In the drying unit 23, the alcohol mixed in the ingredients in the mixing preparing unit 11 and the ball separator unit 21 is evaporated for a predetermined period of time by heating, depressurization, or the like in a step S75. More specifically, as shown in FIGS. 13(a) and 13(b), the turntable 410, which is intermittently rotatable through a certain angle under the control of a command signal, is disposed in a drying chamber 400 surrounded by a thermally insulating material. The turntable 410 has a plurality of holes defined at equal angular intervals in a circumferential pattern, for receiving containers 306₁ therein. Circular heaters 0 mounted on each air cylinder are positioned immediately below these holes. These heaters 420 can independently be turned on and off. Air nozzles 433 for ejecting hot air are disposed above the turntable 410 in vertical confronting alignment with the heaters 420, respectively. Hot air made by heating the air taken in from air intake means 435 by an air heater 430 is supplied to the air nozzles 433 through ducts 432 by an air blower 431 for the air nozzles. The air blower 431 also supplies hot air below the turntable 410 through ducts 434. When a container 306₁ is moved through the inlet/outlet port 402, doors 442 which separate the drying chamber 400 from the inlet/outlet port 402 are opened and closed by air cylinders 441. When a temperature sensor on the turntable 410 detects an abrupt temperature rise of the bottom surface of container 306₁ after the ethanol has been evaporated, it is determined that the ingredients in the container 306₁ have been dried. After the alcohol has been evporated and the ingredients have been dried, the container 306₁ is removed from the inlet/outlet port 402 by the robot 401 in a step S76, and delivered to a next process by the conveyor 320 in a step S77.

The bar code on the container 306₁ is read on the conveyor 320 in a step S78. Though the bar code may not necessarily be read on the conveyor 320, it is preferably read to prevent errors if the container 306₁ is revolved by the turntable 410 in the drying unit as shown in FIGS. 13(a) and 13(b). The condition in the drying unit 23, particularly the information indicating whether the drying unit 23 can accept a container 306₁ or not, is fed back to the mixing unit 20 to control the operation of the mixing unit 20.

Figure 14:
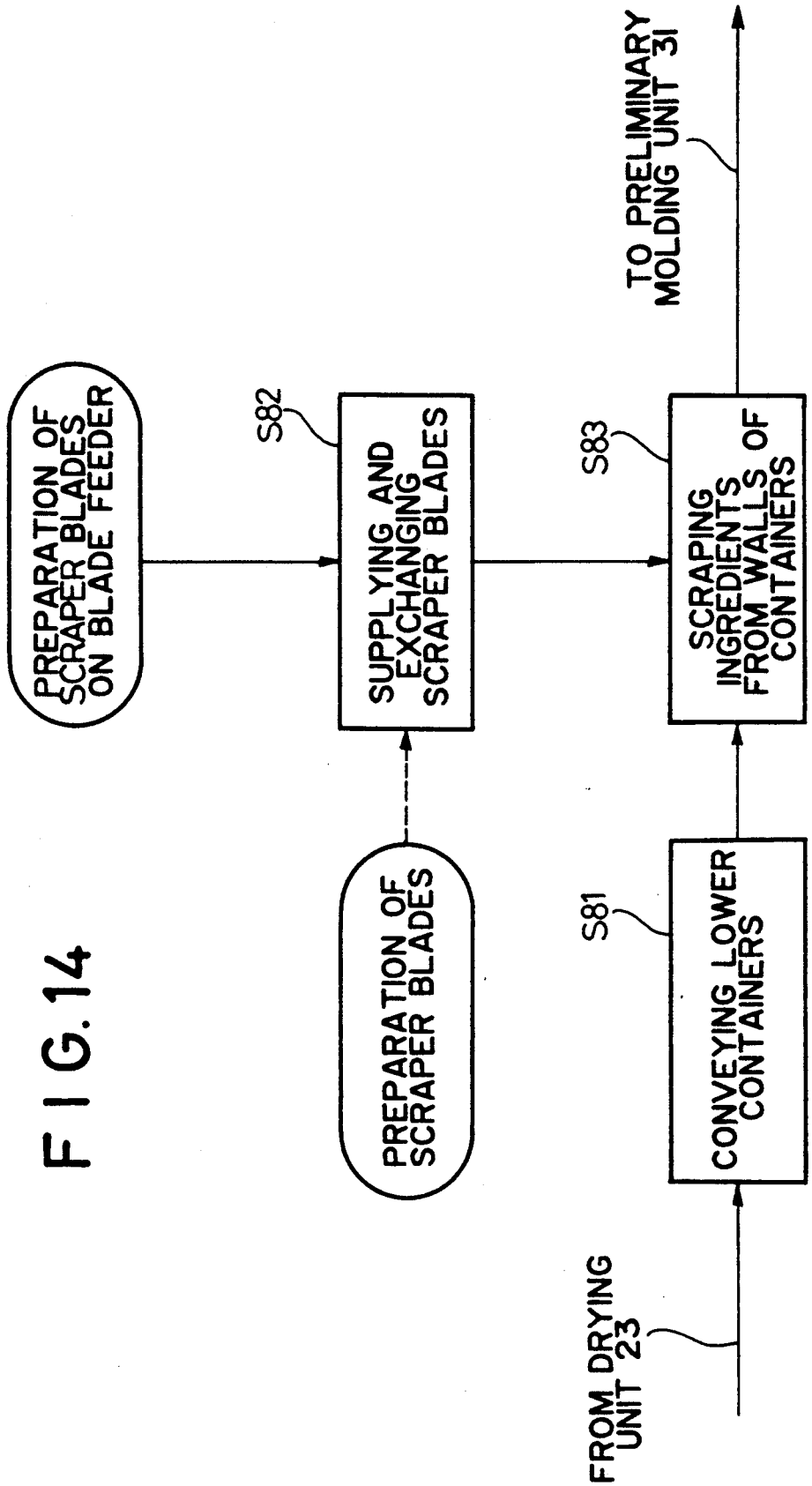
FIG. 14 is a flowchart showing the steps of operation of a preliminary molding preparing unit.

A preliminary molding preparing unit 30 will be described with reference to FIG. 14.

The container $306_1$, after the ingredients therein have been dried, is fed by the conveyor 320 in a step S81. New scraper blades have been set on a sample scraper in a step S82. The delivered container $306_1$ is positioned and fixed on the conveyor 320, and the ingredients in the container $306_1$ are scraped by the scraper blades in a step S83, so that any powder on the inner wall of the container $306_1$ is scraped off. The used scraper blades will subsequently be replaced with new scraper blades by a blade replacing machine having an automatic blade feeder.

Figure 15B:
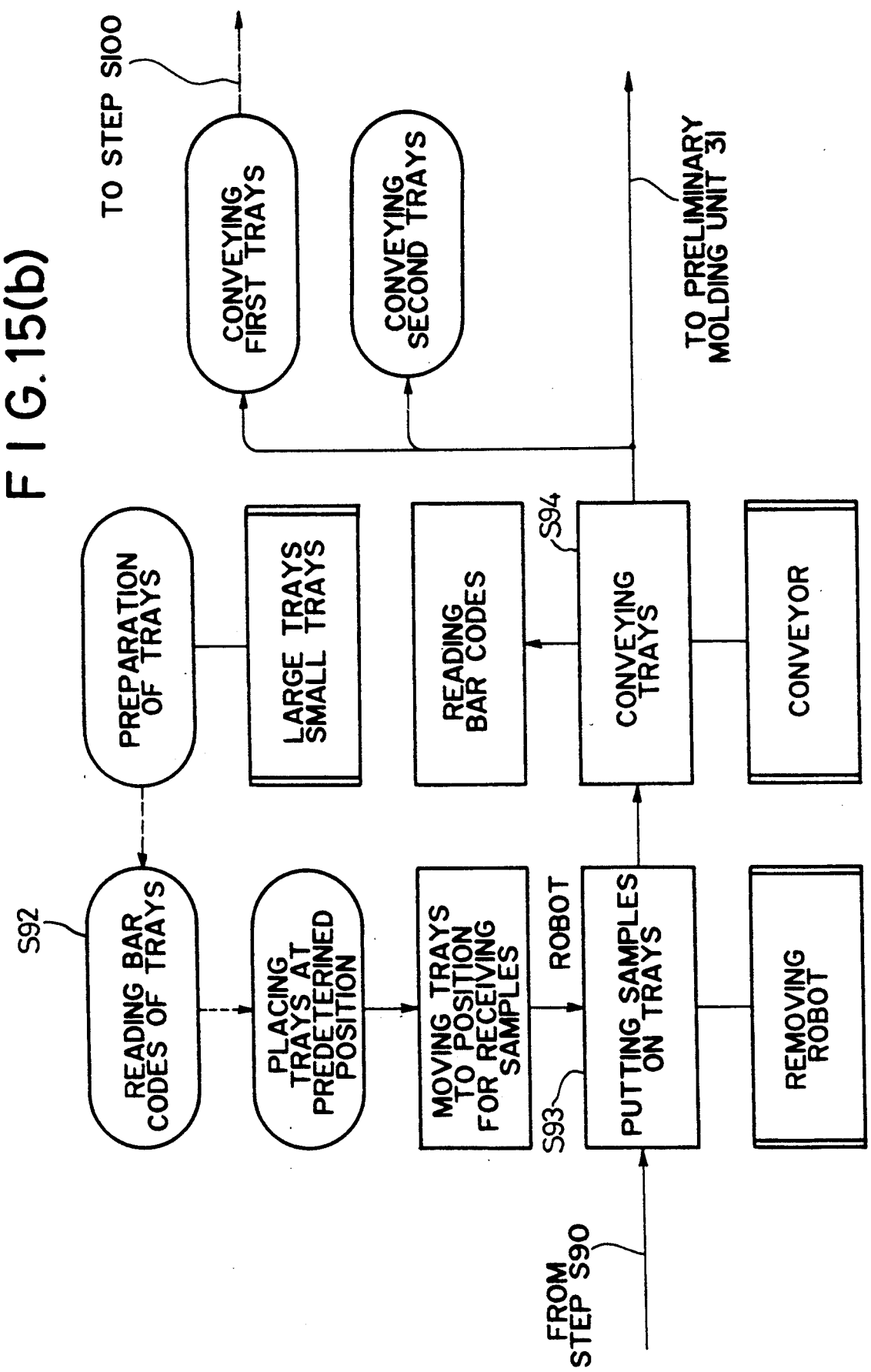

A predetermined molding unit 31 will be described with reference to FIGS. 15(a) and 15(b). The container $306_1$ with the ingredients scraped off the inner wall thereof is supplied from the preliminary molding preparing unit 30. The container $306_1$ is moved to a position just above a hopper held at a predetermined position and reversed by a reversing device and the content of the container 306 is transferred in a step S85 into the hopper which has been positioned on a feed conveyor at the predetermined position in a step S87. After the container $306_1$ has been reversed, it is removed to a prescribed position. An array of empty hoppers is generally manually arranged in a hopper supplying machine in a step S86. The hopper is filled with the ingredients supplied from the reversed container $306_1$, and transferred to and positioned in a preliminary molding machine in a step S88. The ingredients or sample is automatically measured and supplied by a weighing feeder in a step S89. The sample is supplied to a molding machine and molded thereby, preferably by pressing, and the molded sample is taken out of the molding machine and received by a tray of an orthogonal robot, and the molding machine from which the molded sample has been taken is cleaned by a vacuum device. This process is repeated until a predetermined number of preliminarily molded samples are formed in a step S90. Trays with bar codes applied thereto are prepared in advance on a robot table, generally through a manual operation. The trays which have received the molded samples of the same composition are automatically fed from the robot table by a feed conveyor on which the bar codes on the trays are read in a step S92. Thereafter, the trays are classified into first trays container samples to be reserved, second trays containing samples to be thrown away, and third trays containing samples to be preliminarily sintered. The second trays contain one sample or a certain small number of samples molded in (an) initial molding shot(s), so that any contamination from those samples molded in the previous molding cycle will not affect the present samples. The third trays usually keeps a certain additional number of samples which may make up for any loss of samples. A layer of alumina powder is applied in advance as an adhesion-resistant material to the inner bottom surfaces of the third or other trays to be sintered for preventing the preliminarily sintered molded samples from adhering (being welded) to the trays.

When the first, second, or third trays of the same composition are moved to a preliminary sintering process or the like, it is efficient to place about ten trays in a larger tray as shown in FIGS. 16(a) and 16(b). The trays placed in the larger tray will be referred to as smaller (small) trays. No adhesion-resistant material is applied between the larger and smaller trays. The adhesion-resistant material and the larger tray will also be employed in a main sintering unit 35 which will be described later on as well as in a preliminary sintering unit 32. After samples are delivered into small trays in a large tray in a step S93, the large tray containing small trays is transferred in a step S94 to a preliminary molding unit 31. During the step S94, the bar code on the large tray is read by a bar-code reader.

Figure 17:
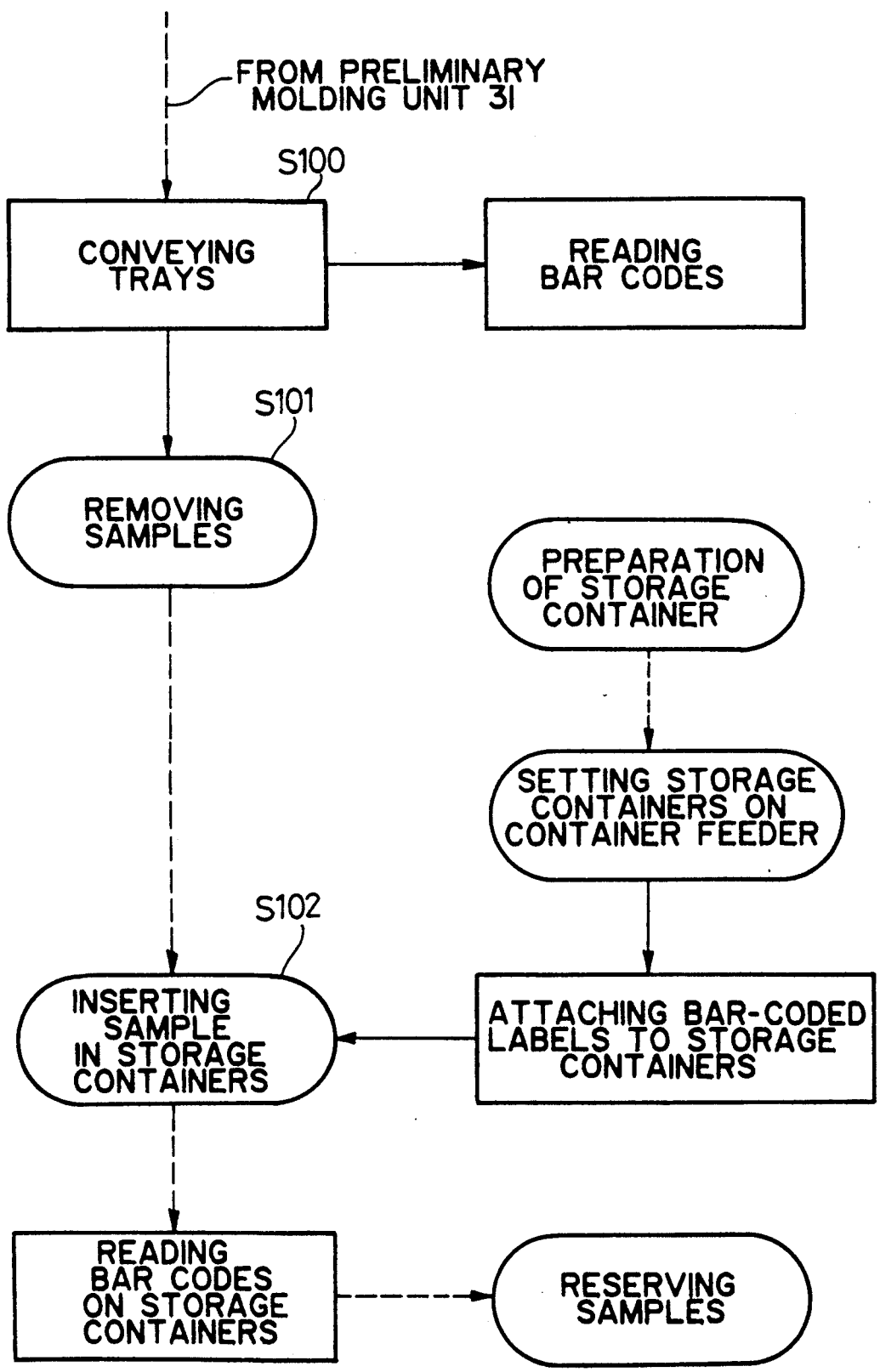
FIG. 17 is a flowchart showing the steps of operation of a sample preserving unit.

The preliminarily molded sample of ceramic superconducting material or the like is delivered from the preliminary molding unit 31 to a sample reserving unit 40 as shown in FIG. 17.

More specifically, the trays fed from the preliminary molding unit 31 are fed by a feed conveyor of the sample preserving unit 40 in a step S100. While the trays are being fed by the feed conveyor, the bar codes on the trays are read by a bar code reader, and their correspondence to the composition of the material is recorded. Thereafter, the trays are delivered to a sample removing position, at which the samples are taken out in a step S101, and inserted and reserved in a storage container having a bar code in a step S102. The information represented by the bar codes applied to the tray and the storage container will be processed in various subsequent processes for correspondence between itself and the composition of the sample supported on the tray or contained in the container. The information is automatically recorded in a central control/storage/command system typically in the form of a host computer, the bar codes are automatically compared based on the recorded information, and command signals are automatically supplied to various units and devices.

Delivery of the preliminarily molded superconducting material from the preliminary molding unit 31 to the preliminary sintering unit 32 will be described below with reference to FIG. 18.

When the trays are delivered from the preliminary molding unit 31 to the preliminary sintering unit 32 by the feed conveyor, the trays are placed on the bottom of preliminary sintering furnaces A, B, typically Muffle furnaces, by a robot in a step S110. When the trays are placed in the furnaces, the doors thereof are automatically opened and closed. After the samples have been preliminarily sintered in a step S111, the furnace doors are automatically opened, the trays are removed by the robot in a step S112 and then fed to the next process by a feed conveyor in a step S113. While the trays are being fed by the feed conveyor, their bar codes are read.

Figure 19A:
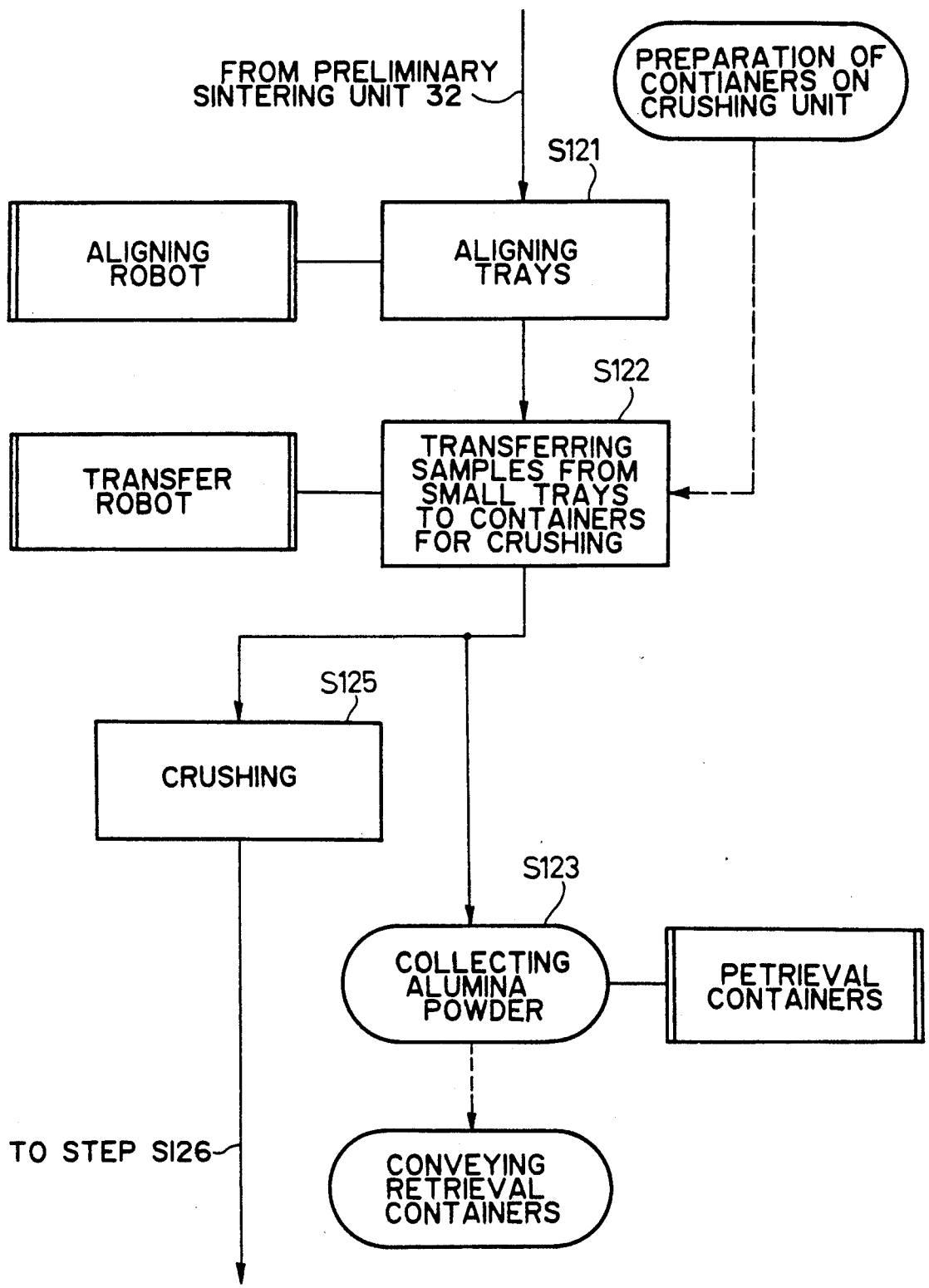
FIG. 19(a) and 19(b) are flowcharts showing the steps of operation of a crushing unit.
Figure 19B:
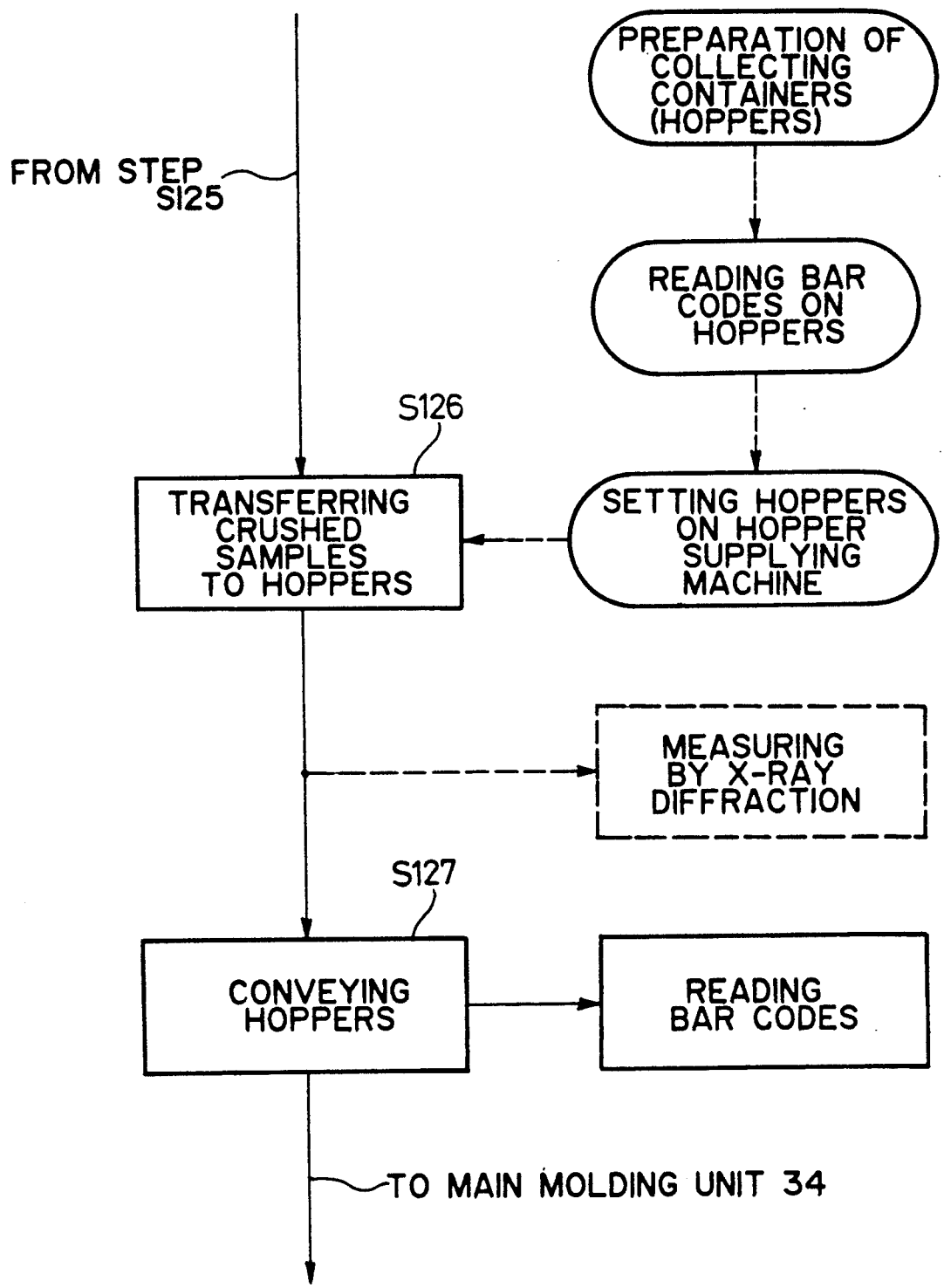

A crushing unit 33 will be described with reference to FIGS. 19(a) and 19(b). When the trays are fed from the preliminary sintering unit 32 to the crushing unit 33, the trays are aligned by an aligning robot in the crushing unit 33 in a step S121, and the smaller trays are taken out and the samples transferred from the smaller trays into a container by a transfer robot in a step S122. While the smaller trays are being transferred, it may be necessary to draw or blow air to remove alumina powder, being the adhesion-resistant material, from the molded samples. Any remaining alumina powder or adhesion-resistant material in the smaller trays is collected in a retrieval (recovering) container by rotating the smaller trays or under a vacuum in a step S123. The empty larger and smaller trays are collected by a collecting means (not shown). The samples which have been transferred into the container in the step S122 are then charged into an automatic crushing machine and crushed thereby in a step S125. The crushed sample is then transferred to a collecting container comprising a hopper in a step S126. A bar code applied to the hopper is read by a bar code reader and recorded, and then the hopper is delivered to a next process by a conveyor in a step S127.

Figure 20A:
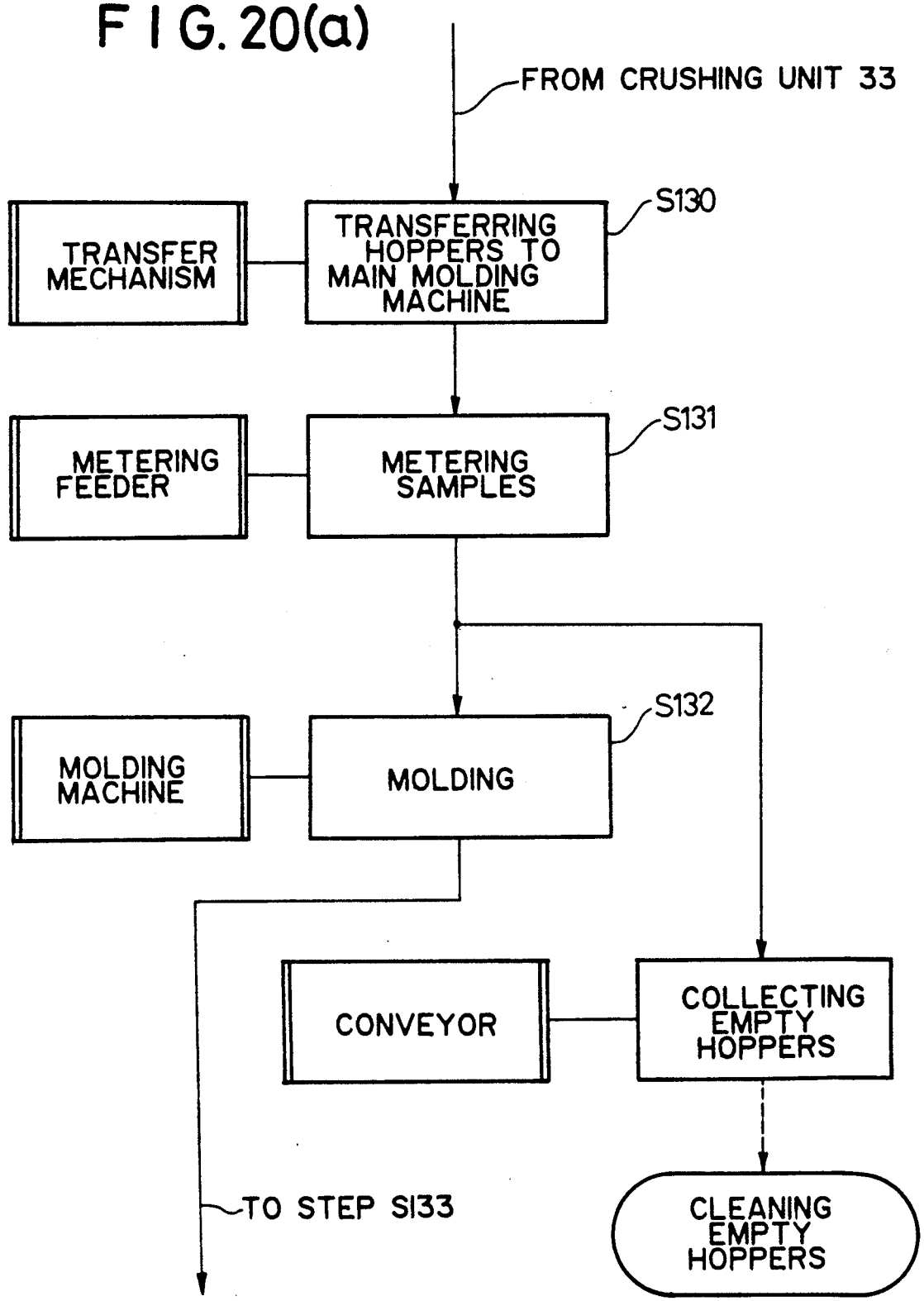
FIG. 20(a) and 20(b) are flowcharts showing the steps of operation of a main (full) molding unit.
Figure 20B:
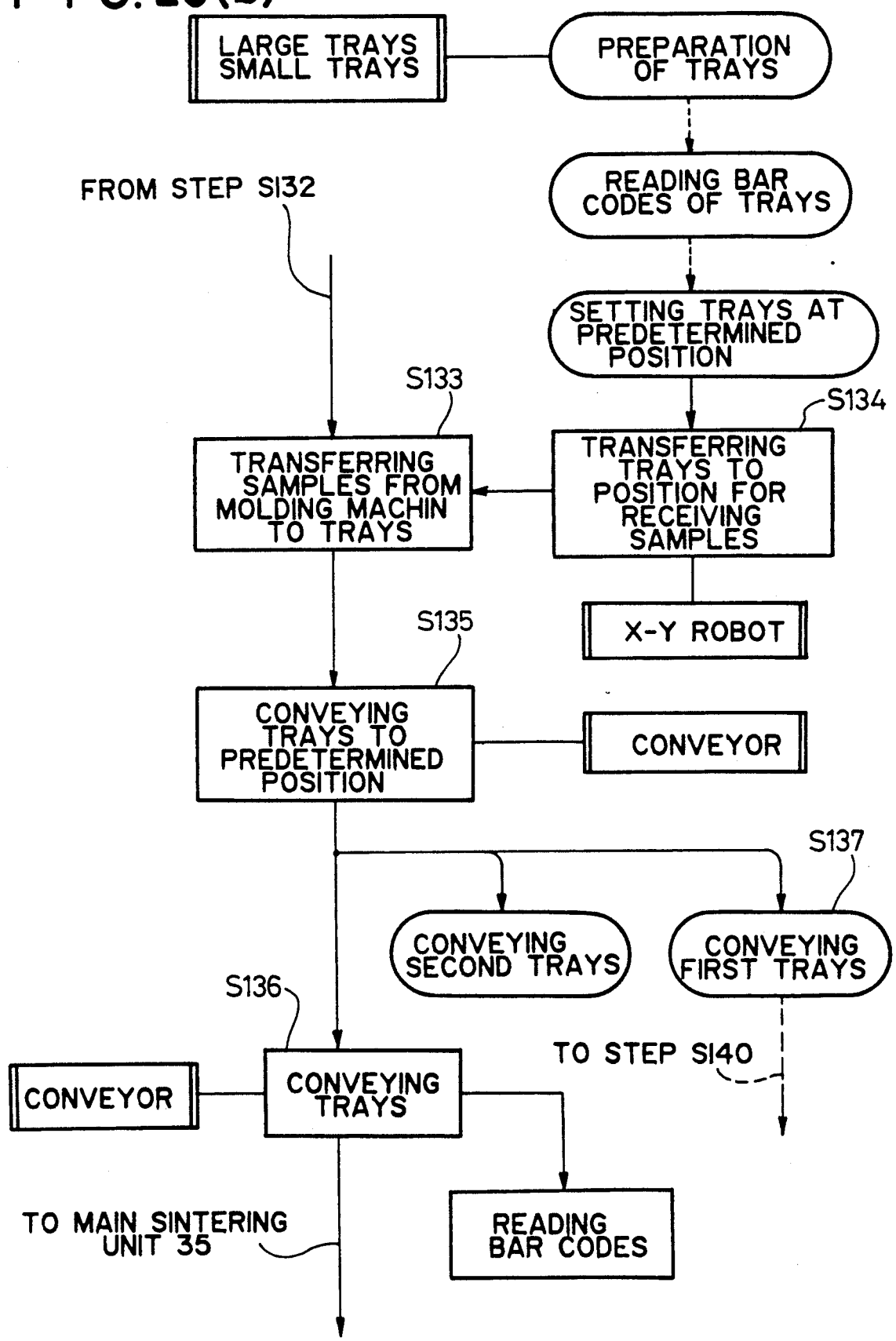

A main molding unit 34 will be described with reference to FIG. 20.

After the hopper arrives from the crushing unit 33 at the main molding unit 34, the hopper is transferred to a main molding machine by a transfer mechanism in a step S130. The sample is automatically metered (weighed) by a (weighing) metering feeder in a step S131. Then, the weighed sample is supplied to a mold assembly and molded thereby in a step S132. The molded sample is removed by a removing robot in a step S133, transferred to a tray which has been delivered by an orthogonal robot in a step S134, and the mold assembly is cleaned by a vacuum device. The above process is repeated to produce a predetermined number of molded samples similar to the above preliminary molding. The tray is manually positioned in advance on a robot table. After the molded samples have been produced, the tray filled with the molded samples is automatically removed from the robot table by a feed conveyor in a step S135. On the feed conveyor, a bar code applied to the tray is read. Trays thus delivered are classified into first trays containing samples to be reserved, second trays containing samples to be thrown away, and third trays containing samples to be fully sintered. This classification, use of an adhesion-resistant material, and use of larger and smaller trays are the same as with the preliminary molding process described above. The third trays are then delivered to a next process in a step S136.

Figure 21:
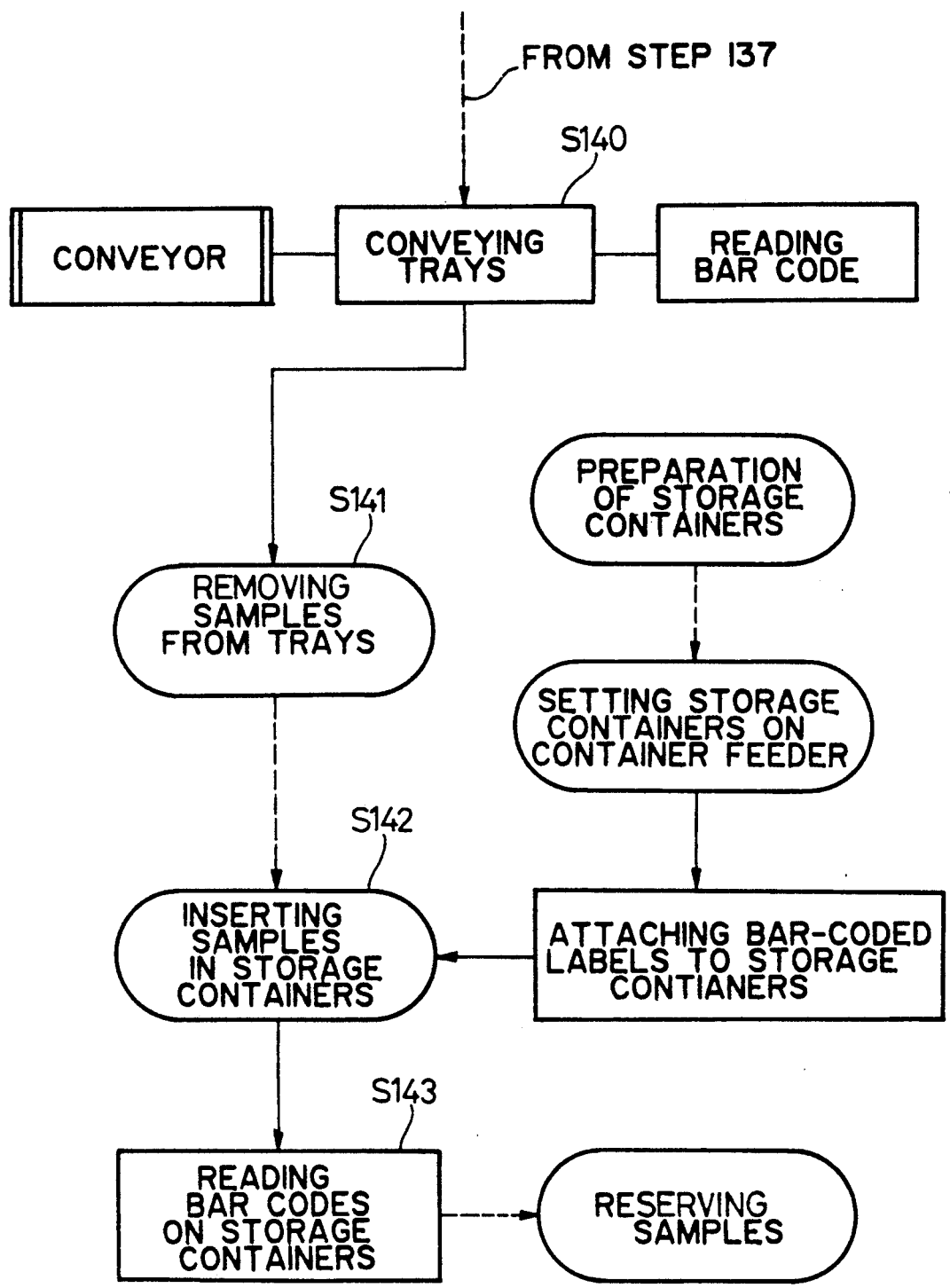
FIG. 21 is a flowchart showing the steps of operation of a sample preserving unit.

Delivery of the trays from the main molding unit to a sample preserving unit 41 will be described with reference to FIG. 21.

The trays delivered from the main molding unit 34 is fed by a feed conveyor in a step S140. While the trays are being fed by the feed conveyor, their bar codes are read by a bar code reader, their correspondence to the composition of the molded samples is recorded, after which the trays are fed to a sample removing position in a step S140, in which the samples are taken out in a step S141, and inserted in a storage container having a bar code in a step S142. The bar code on the storage container is read in a step S143.

Figure 22:
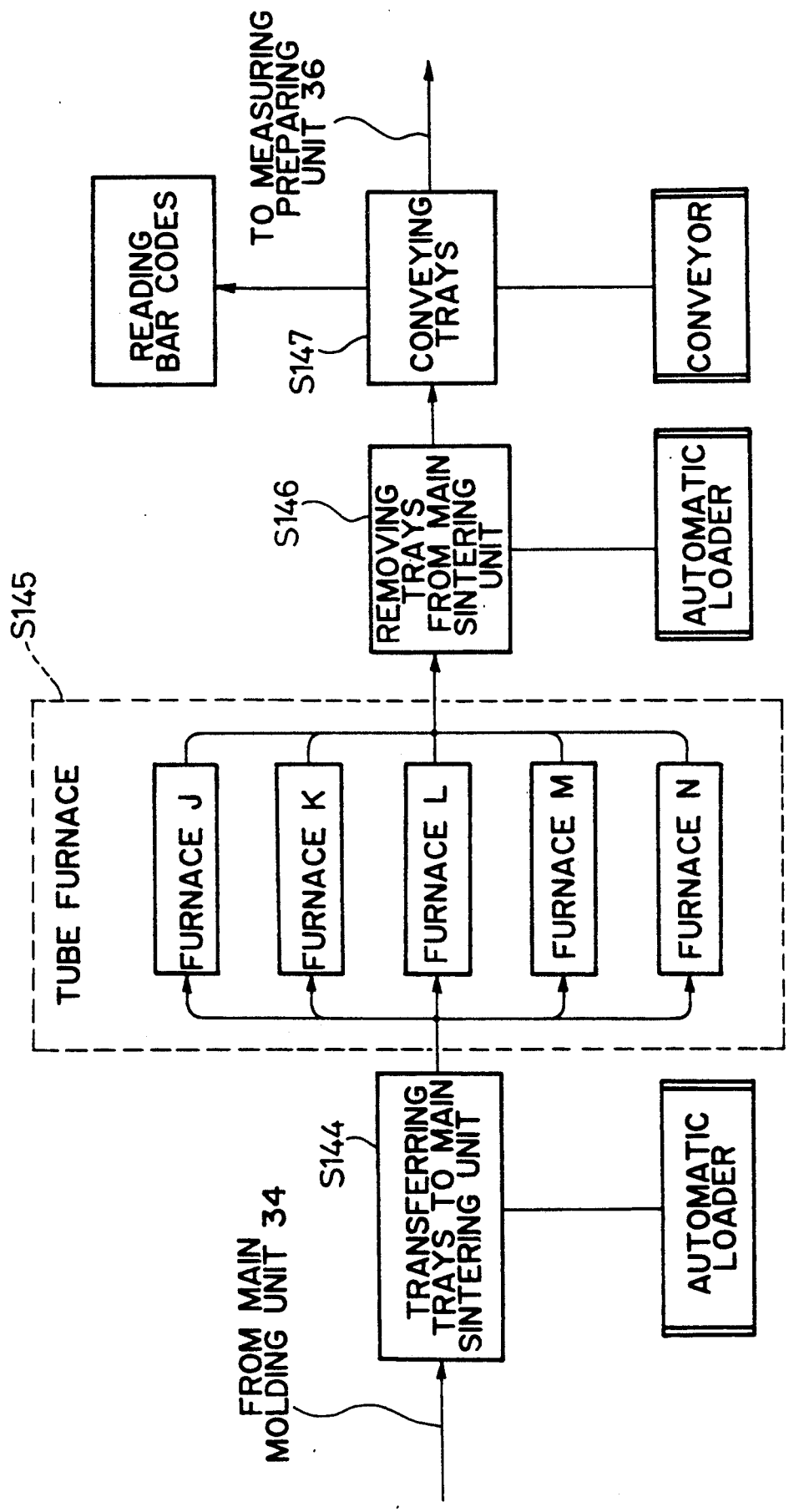
FIG. 22 is a flowchart showing the steps of operation of a main (full) sintering unit.

The samples are fed from the main molding unit 34 to a main sintering unit 35 as shown in FIG. 22.

More specifically, the trays transferred to the feed conveyor of the main molding unit 34 is fed to the main sintering unit 35. Then, the trays are transferred to forks in front of main sintering furnaces J, K, L, M, N, typically tubular furnaces, by an automatic loader in a step S144. The doors of these main sintering furnaces are automatically opened and closed, and the trays are introduced from the forks into the furnaces by an automatically loading and unloading device, placed in core tubes in the furnaces, and the samples are fully sintered in a step S145. Thereafter, the trays are removed from the furnaces by the automatic loading and unloading device, and then transferred to a conveyor leading to a next process by the automatic loader in a step S146. While the trays are being fed by the conveyor in a step S147, the bar codes on the trays are read.

Figure 23:
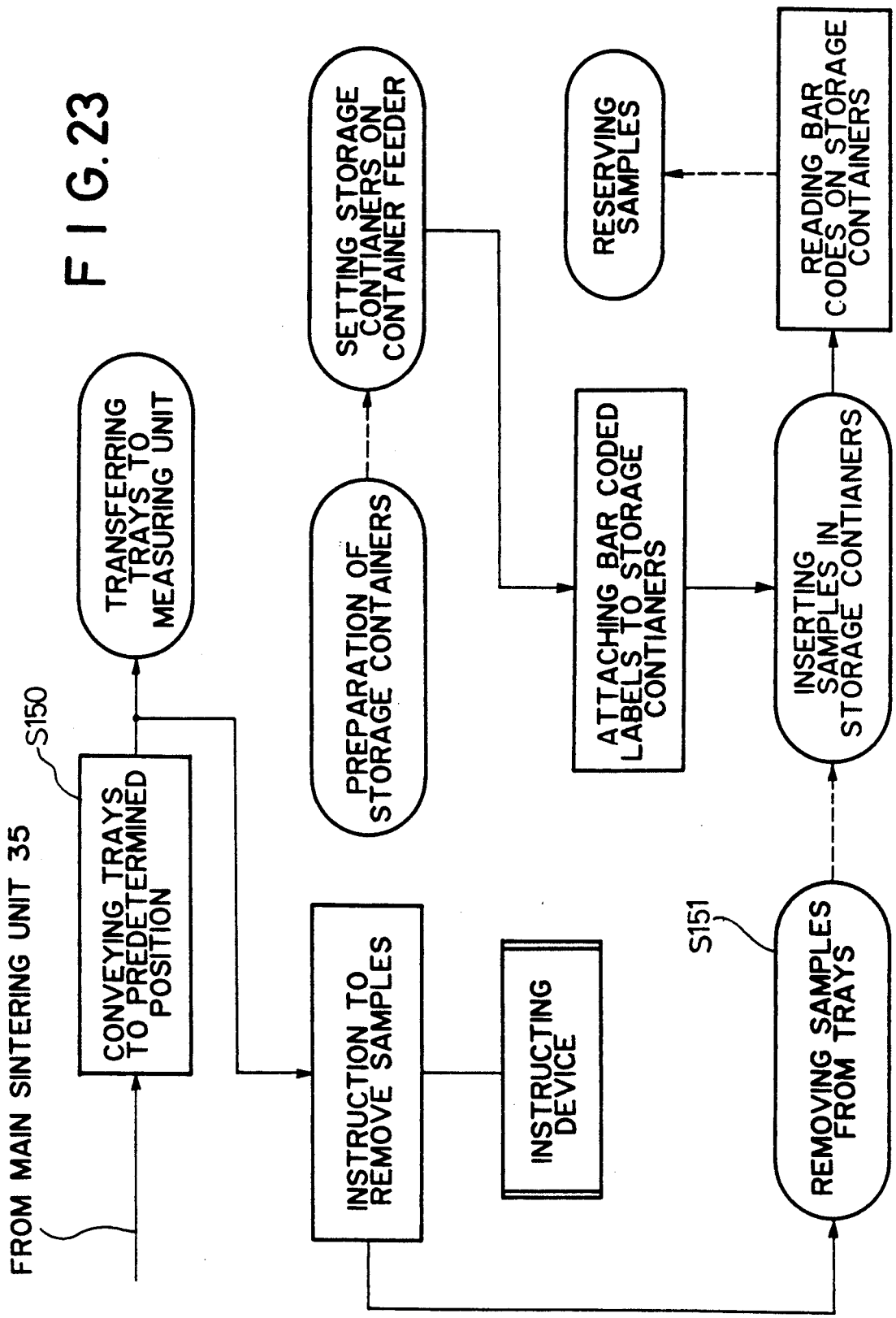
FIG. 23 is a flowchart showing the steps of operation of a measurement preparing unit and a sample preserving unit.

A measurement preparing unit 36 will be described below with reference to FIG. 23.

The trays transferred to the feed conveyor of the main sintering unit 35 is fed to the measurement preparing unit 36. The trays are stopped in a predetermined position in a step S150. The samples are fed for measurement and preservation by the feed conveyor. Bar codes are printed or labeled on the trays storing those samples which are to be measured, read and recorded at a certain position. The samples to be preserved are taken out at a step S151, at which time alumina powder is removed from the samples and the larger and smaller trays are recovered in the same manner as with the process in the crushing unit shown in FIG. 19.

Figure 24:
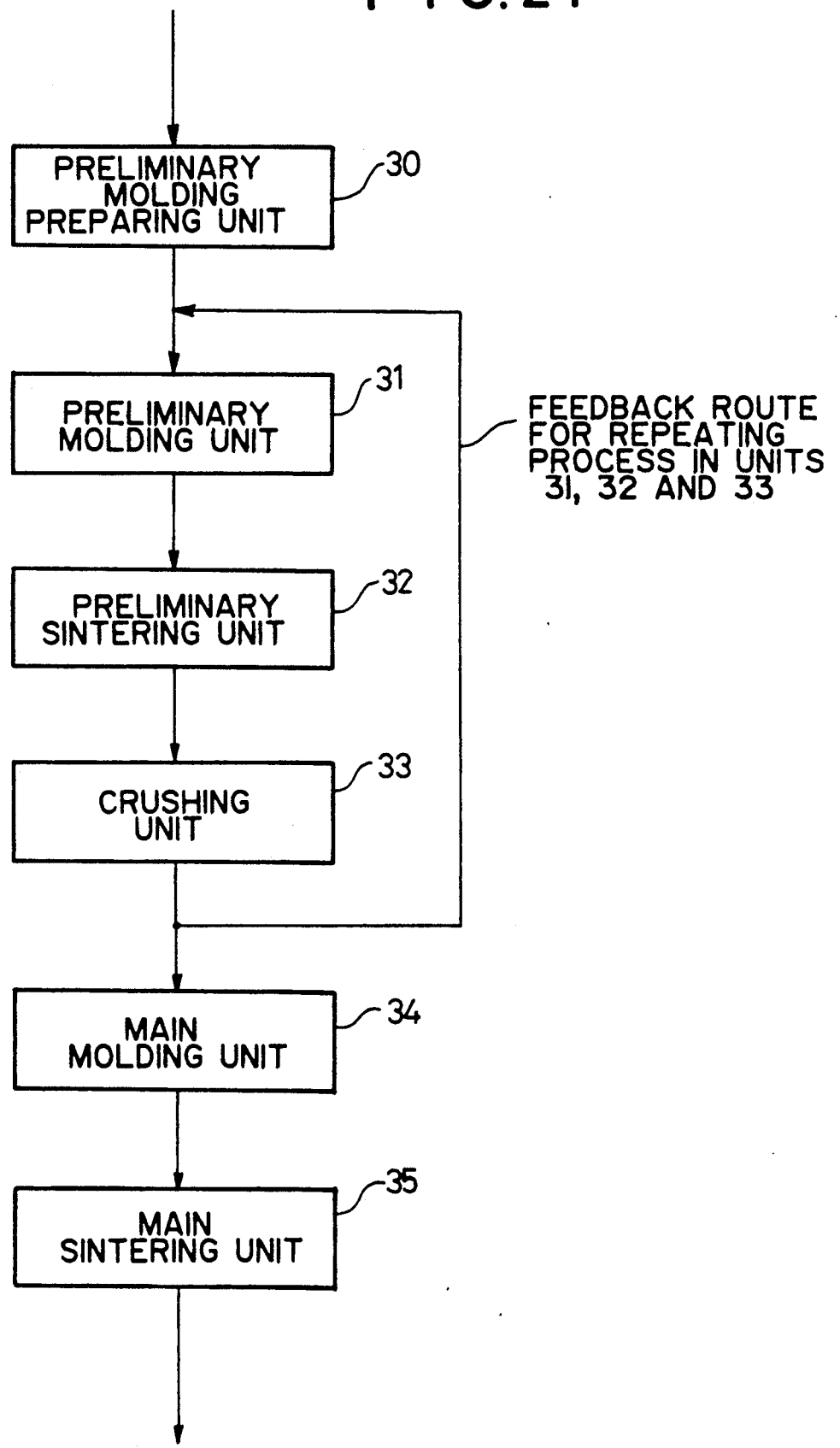
FIG. 24 is a block diagram of a system according to a second embodiment of the present invention.

A second embodiment of the present invention will be described with reference to FIG. 24.

In the second embodiment, the processes in the preliminary molding unit 31, the preliminary sintering unit 32, and the crushing unit 33 are repeated, and then the processes in the main molding unit 34 and the main sintering unit 35 are carried out.

According to a third embodiment, the preliminary molding unit 31, the preliminary sintering unit 32, and the crushing unit 33 may be dispensed with (or bypassed), and the preliminary molding preparing unit may be directly incorporated as a molding preparing unit into the main molding unit 34.

Although certain preferred embodiments have been shown and described, it should be understood that many changes and modifications may be made therein without departing from the scope of the appended claims.

In block diagrams or flowcharts in the drawings for the present invention, portions in broken-line arrow may be operated manually with little loss in diminishing or covering up the disadvantages of the conventional method or apparatuses.

What is claimed is:

1. A system for manufacturing a multi-element sintered material comprising:
   means for moving a first container to a first location;
   means for automatically weighing and supplying powdery ingredients of said sintered material into said first container at said first location;
   means for automatically introducing grinding media and a volatile liquid into said first container;
   means for sealing said first container with a lid bearing a first code regarding the ingredients contained in the first container;
   means for reading said first code;
   means for moving said sealed container in a manner to cause mixing of the ingredients contained therein;
   means for removing said lid from said first container;
   means for separating said grinding media from the mixed ingredients;
   means for transferring said mixed ingredients into a second container bearing a second code regarding the contents of said second container;
   mean for reading said second code;
   means for comparing said first code with said second code;
   means for heating said second container to dry said mixed ingredients contained therein;
   means for preliminarily molding said dried, mixed ingredients with a mold assembly into a sample; and
   means for storing information regarding the composition of said sample.

2. A system according to claim 1, wherein said means for moving said sealed container comprises:
- a plurality of paris of roller shafts with a frictional roller fitted over each of said shafts;
- a support device on which said roller shafts are rotatably supported such that said roller shafts are grouped into said pairs with the rollers on paired shafts being spaced from each other in confronting relation in each pair, said support device including an attachment frame on which said roller shafts are equally horizontally spaced;
- a robot hand;
- a vertical feeder for vertically moving said robot hand, said robot hand being mounted on said vertical feeder;
- a horizontal orthogonal feeder for moving said vertical feeder over said foller shafts supported on said frame to cause said robot hand to supply said sealed container onto confronting rollers of a pair of roller shafts and also to cause said robot hand to feed said sealed container from the rollers of a pair of roller shafts to a next step;
- a drive device for rotating each pair of roller shafts in the same direction; and
- a rotating container holding device for keeping the sealed container in position when the sealed container is rotated by the confronting rollers of the roller shafts after being supplied thereonto.

3. A system according to claim 1, wherein said means for automatically weighing and supplying powdery ingredients comprise:
- means for supplying said first container onto an electronic scale;
- means for moving weighing hoppers supported on a hopper support means and containing the ingredients into a weighing position; and
- means for weighing the ingredients with the electronic scale by weights indicated by a controller and dropping the weighed amounts of ingredients from said hoppers into said first container.

4. A system according to claim 1, wherein said means for separating the mixing media comprises:
- means for discharging the ingredients from said first container onto a screen removably attached over said second container;
- means for vibrating said second container and said screen covered with a screen-cover while spraying a volatile liquid through the screen-cover over said screen, opening said screen-cover, and removing the screen with the mixing media retained thereon.

5. A system according to claim 1, further comprising:
- means for automatically supplying the sample to a sintering furnace and preliminarily sintering the sample;
- means for automatically crushing the preliminarily sintered sample;
- means for fully molding the crushed sample with a mold assembly into a fully molded sample; and
- means for fully sintering the fully molded sample and feeding the fully sintered sample to a measuring process.

6. A system according to claim 1, wherein said means for automatically weighing and supplying said powdery ingredients comprises:
- a horizontally movable horizontal weighing hopper table;
- a plurality of weighing hoppers disposed and vertically held on said weight hopper table and detachably attached thereto;
- a moving device for horizontally moving said weighing hopper table while stopping said weighing hoppers successively at said first location;
- an electronic scale disposed directly below said first location;
- a drive device for driving the weighing hopper to cause the ingredients contained therein to drop out after each of the weighing hoppers is stopped at said first location;
- a first container supply/transfer device for supplying one first container at a time onto said electronic scale to store the ingredients dropped from each of said weighing hoppers at said first location, so that the ingredients stored in said first container are weighted by said electronic scale, and for transferring the first container in a first direction if the weights of the ingredients measured by said electronic scale agree with indicated weights, or in a second direction if the weights of the ingredients measured by said electronic scale disagree with the indicated weights; and
- a conveyor for feeding the first container transferred in said first direction to a subsequent step; and
- said means for automatically introducing grinding media and a volatile liquid into said first container comprising a container stopping device for stopping the first container fed by said conveyor at a second location;
- a liquid spraying device for detecting when said first container is stopped at said second location, spraying a volatile liquid uniformly into the stopped first container, releasing said first container and transferring the first container by a conveyor to a subsequent step; and
- a ball supply device for supplying balls covered with a resin layer into the first container while the first container is stopped at said second location by said container stopping device.

7. An apparatus according to claim 6, wherein each of said balls comprises a metal ball covered with said resin layer.

8. An apparatus according to claim 6, wherein said liquid spraying device comprises means for spraying a first amount of said volatile liquid and a second amount of said volatile liquid and said ball supply device comprising means for supplying the balls after said first amount of volatile liquid and before said second amount of volatile liquid.

9. An apparatus according to claim 6, further including:
- a fixing device for stopping said first container at a third location when said first container with the volatile liquid and the balls contained therein is released by said container stopping device and transferred by the conveyor;
- a robot for attaching a lid to said first container stopped by said fixing device;
- a reader for reading a mark applied to the lid attached to said first container when said first container with the lid attached thereto is released by said fixing device and fed into a fourth location by the conveyor; and
- memory means for storing information on the mark and the composition of the ingredients contained in said first container in corresponding relation to each other.

10. An apparatus according to claim 6, wherein said weighing hopper table comprises a turntable.

11. An apparatus according to claim 10, wherein each of said weighing hoppers has an inner surface covered with a resin layer for contacting with the ingredients.

* * * * *

UNITED STATES PATENT AND TRADEMARK OFFICE
CERTIFICATE OF CORRECTION

PATENT NO.   : 5 035 597
DATED        : July 30, 1991
INVENTOR(S)  : Shoji TANAKA et al It is certified that error appears in the above-identified patent and that said Letters Patent is hereby corrected as shown below:

Column 14, line 59; change "mean" to ---means---.
Column 15, line 3;  change "paris" to ---pairs---.
Column 15, line 17; change "foller" to ---roller---.
Column 16, line 14; change "weighted" to ---weighed---.

Signed and Sealed this

Eighth Day of June, 1993

Attest:

MICHAEL K. KIRK

Attesting Officer

Acting Commissioner of Patents and Trademarks